US010726274B1

(12) United States Patent
Hasegawa et al.

(10) Patent No.: US 10,726,274 B1
(45) Date of Patent: Jul. 28, 2020

(54) INVESTIGATION ASSIST SYSTEM AND INVESTIGATION ASSIST METHOD

(71) Applicant: PANASONIC I-PRO SENSING SOLUTIONS CO., LTD., Fukuoka (JP)

(72) Inventors: Masayuki Hasegawa, Fukuoka (JP); Ryutaro Sen, Fukuoka (JP); Keiichi Fujiwara, Fukuoka (JP); Kosuke Shinozaki, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/564,729

(22) Filed: Sep. 9, 2019

(30) Foreign Application Priority Data

Feb. 25, 2019 (JP) ................................ 2019-031980

(51) Int. Cl.
| | | |
|---|---|---|
| *G06K 9/00* | (2006.01) | |
| *H04N 5/247* | (2006.01) | |
| *G06F 16/78* | (2019.01) | |
| *H04N 7/18* | (2006.01) | |
| *H04L 29/08* | (2006.01) | |

(52) U.S. Cl.
CPC ..... *G06K 9/00771* (2013.01); *G06F 16/7867* (2019.01); *G06K 9/00288* (2013.01); *G06K 9/00832* (2013.01); *H04N 5/247* (2013.01); *H04N 7/181* (2013.01); *G06K 2209/15* (2013.01); *H04L 67/10* (2013.01)

(58) Field of Classification Search
CPC .......... G06K 9/00771; G06K 9/00832; G06K 9/00288; G06K 2209/15; G06F 16/7867; H04N 5/247; H04N 7/181; H04L 67/10
See application file for complete search history.

(56) References Cited

U.S. PATENT DOCUMENTS 6,466,260 B1 * 10/2002 Hatae ................... G08G 1/0175
348/149

FOREIGN PATENT DOCUMENTS

JP       2007-174016       7/2007

* cited by examiner

*Primary Examiner* — Nam D Pham
(74) *Attorney, Agent, or Firm* — Greenblum & Bernstein, P.L.C.

(57) ABSTRACT

Provided is an investigation assist system including a server communicably connected to a first camera and one or more second cameras; and a client terminal communicably connected to the server. The first camera captures a wide range of an intersection, and the one or more second cameras capture a license plate and a face of a person in a vehicle entering the intersection, and the first camera and the one or more second cameras are arranged at each intersection. The server searches for vehicles using videos captured by the first camera and the one or more second cameras corresponding to an intersection at the location on the date included in the search conditions, specifies a captured image of the escaping vehicle, a license plate of the escaping vehicle and an face of a person in the escaping vehicle, and stores a specified result as investigation information of the suspect.

10 Claims, 15 Drawing Sheets

INVESTIGATION ASSIST SYSTEM AND INVESTIGATION ASSIST METHOD

BACKGROUND OF THE INVENTION

1. Field of the Invention

The present disclosure relates to an investigation assist system and an investigation assist method for assisting an investigation of a suspect of an incident or an escaping vehicle of the suspect based on a video captured by each of a plurality of cameras.

2. Background Art

A technology is known that a plurality of camera devices are arranged at predetermined places on a traveling route of a vehicle, and camera image information captured by each camera device is displayed on a display device of a terminal device mounted on a vehicle via a network and a wireless information exchange device (see, for example, JP-A-2007-174016). According to JP-A-2007-174016, a user can obtain a real-time camera image having high information content, by using the camera image information captured by the plurality of cameras arranged on the traveling route of the vehicle.

In JP-A-2007-174016, since the camera image information captured by each of the plurality of camera devices can be displayed on the display device of the terminal device mounted on the vehicle, the user (for example, driver) is able to confirm the real-time camera image information at the location where each camera device is arranged. However, the invention according to JP-A-2007-174016 does not consider how to effectively find, when an incident or accident (hereinafter referred to as "incident") has occurred around the traveling route of the vehicle (for example, an intersection where lots of people and vehicles come and go), an escaping vehicle used by a suspect who has caused the incident and fled from a scene of the incident. In a police's investigation (in particular, initial investigation), what is generally required is to specify a suspect or an escaping vehicle used by the suspect as quickly as possible. However, even though the technology disclosed in JP-A-2007-174016 is used, if an investigator (for example, a police officer) checks images captured by individual camera devices one by one, the investigation takes time and is inefficient, thus it is difficult to find the suspect early.

SUMMARY OF THE INVENTION

The present disclosure is made with consideration of such problems to provide an investigation assist system and an investigation assist method, each of which efficiently assists, in a case where the incident has occurred in vicinity of an intersection where lots of people and vehicles come and go, to specify the suspect or the escaping vehicle used by the suspect, thereby improving convenience of the investigation by the police.

The present disclosure provides an investigation assist system including a server communicably connected to a first camera and one or more second cameras; and a client terminal communicably connected to the server. The first camera captures a wide range of an intersection, and the one or more second cameras capture a license plate and a face of a person in a vehicle entering the intersection, and the first camera and the one or more second cameras are arranged at each intersection. The client terminal receives input of search conditions including a date and a location on and at which an incident has occurred and appearance feature of an escaping vehicle in which a suspect of the incident rides, and sends an information acquisition request for the escaping vehicle satisfying the search conditions to the server, the server receives the information acquisition request, searches for vehicles based on videos captured by the first camera and the one or more second cameras corresponding to an intersection at the location on the date included in the search conditions of the received information acquisition request, specifies a captured image of the escaping vehicle, a license plate of the escaping vehicle and a face of a person in the escaping vehicle and stores a specified result as investigation information of the suspect.

The present disclosure also provides an investigation assist method implemented by a server communicably connected to a first camera and one or more second cameras, and a client terminal communicably connected to the server. The first camera captures a wide range of an intersection, and the one or more second cameras capture a license plate and a face of a person in a vehicle entering the intersection, and the first camera and the one or more second cameras are arranged at each intersection. The investigation method includes a step of receiving, by the client terminal, input of search conditions including a date and a location on and at which an incident has occurred, and appearance feature of an escaping vehicle in which a suspect of the incident rides, sending, by the client terminal, an information acquisition request for the escaping vehicle satisfying the search conditions to the server, receiving, by the server, the information acquisition request, searching, by the server, for vehicles based on videos captured by the first camera and the one or more second cameras corresponding to an intersection at the location on the date included in the search conditions of the received information acquisition request, specifying, by the server, a captured image of the escaping vehicle, a license plate of the escaping vehicle and a face of the person in the escaping vehicle, and storing, by the server, a specified result as investigation information of the suspect.

According to the present disclosure, it is possible to efficiently assist, in a case where the incident has occurred in vicinity of an intersection where lots of people and vehicles come and go, to specify the suspect or the escaping vehicle used by the suspect, thereby improving convenience of the police investigation.

DETAILED DESCRIPTION OF THE EXEMPLARY EMBODIMENT

Hereinafter, embodiments particularly disclosing configurations and operations of an investigation assist system and an investigation assist method according to the present disclosure will be described in detail, appropriately referring to the accompanying drawings, provided that the detailed description may be omitted if needed. For example, the detailed description of already well-known factors and redundant descriptions of the substantially same configuration may be omitted. This is to avoid unnecessary redundancy in the following description and to support better understanding by those skilled in the art. The accompanying drawings and the following description are provided to enable those skilled in the art to fully understand the present disclosure, but are not intended to limit the claimed invention.

Hereinafter, the following example will be described in which a police officer tracks a vehicle (in other words, escaping vehicle) used by a suspect of an incident (for example, incident or accident), happened at or in vicinity of an intersection where lots of people and vehicles come and go, as an investigation supported by an investigation assist system.

Figure 1:
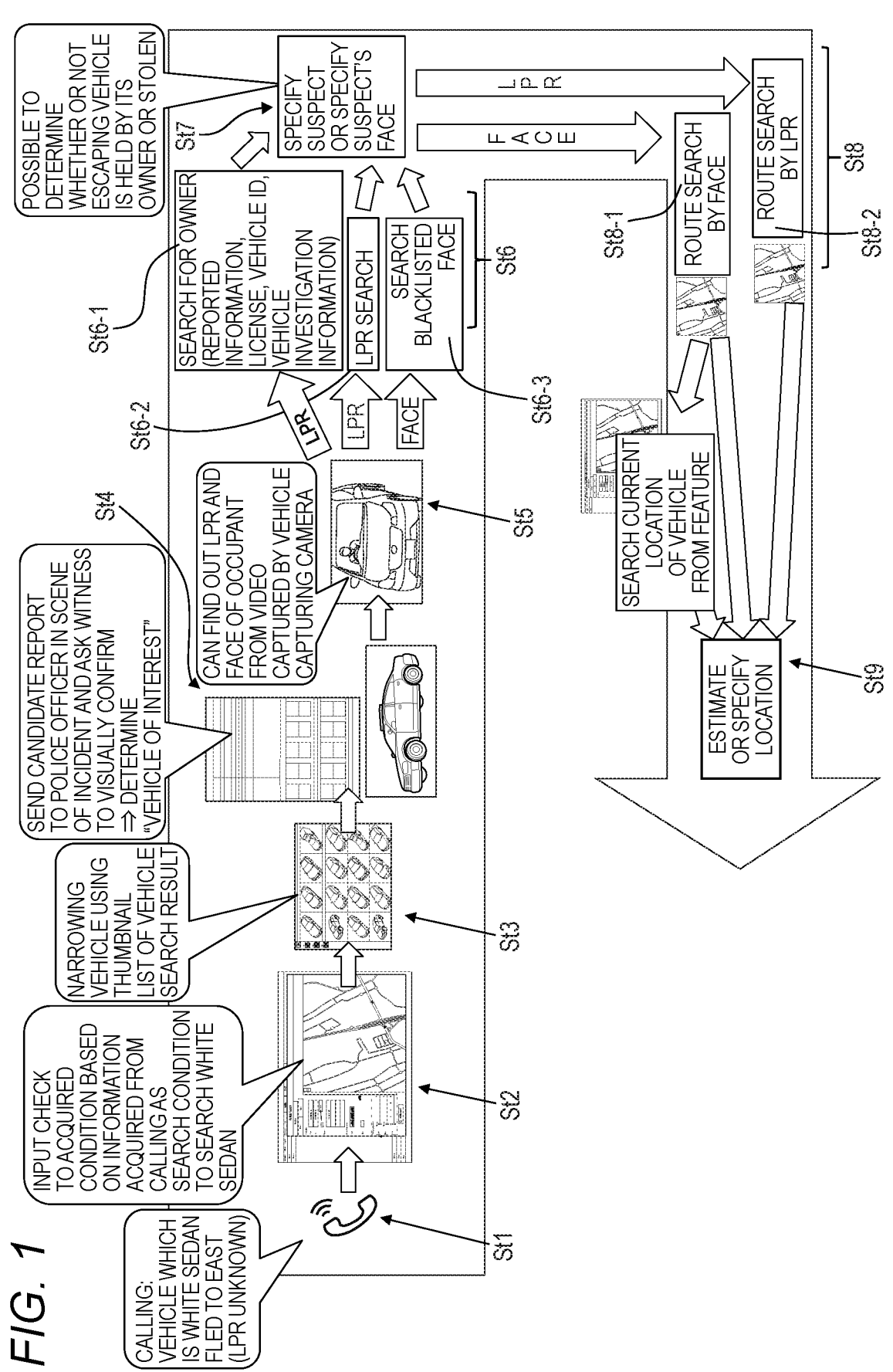
FIG. 1 is an operation flow chart illustrating an example of an operation procedure of a police investigation scenario to which an investigation assist system according to a first embodiment.

An example of an investigation scenario corresponding to an incident involving a police, to which an investigation assist system 100 (see FIG. 2) according to a first embodiment, will be described below with reference to FIG. 1. FIG. 1 is an operation flow chart illustrating an example of an operation procedure of a police investigation scenario to which the investigation assist system 100 according to the first embodiment.

In FIG. 1, it is assumed that the incident (for example, hit-and-run) has occurred at an intersection. Additionally, the incident is not limited to hit-and-run, but hereinbelow a case where a suspect has occurred the incident and fled from a scene with a vehicle will be exemplified for better understanding. In the assumed case, a people who has witnessed the incident (that is, witness) calls (reports) to a police station that he/she saw a vehicle, for example a white sedan, fled to the east (St1). A police operator in the police station who responds to the calling asks the witness when and where he/she has witnessed the incident (date and location). It is also assumed that license plate recognition (LPR) of the escaping vehicle was not available by the witness at this time. In other words, the witness did not recognize the license plate (i.e. number plate) of the escaping vehicle (LPR unavailable). In a case where an escaping vehicle rushes away from the scene of the incident, the witness has a tendency to recall appearance features of the escaping vehicle, such as color or type, but not a license plate. In the investigation scenario according to the first embodiment, it does not matter if the witness recalls the license plate of the escaping vehicle.

Receiving the calling in step St1, the operator inputs or checks various conditions based on information acquired from the calling (see FIGS. 8 to 10), as search conditions of the escaping vehicle, with a client terminal 90 (see FIG. 2), and thus a vehicle search server 60 (see FIG. 2) is requested to search the white sedan (St2). The vehicle search server 60 searches for the white sedan in response to the request from the client terminal 90, and extracts and returns to the client terminal 90 a thumbnail image exhibiting a vehicle appearance of the white sedan and a thumbnail image including an occupant's face and a license plate of the white sedan as a vehicle search result (an example of investigation information of the suspect). Moreover, the vehicle search result returned by the vehicle search server 60 includes an analysis result of a candidate vehicle, which is obtained by a vehicle search carried on videos captured by each of a plurality of cameras (in particular, an intersection camera 10 and a vehicle capturing camera 20), although details will be described later. The client terminal 90 displays the vehicle search result including the thumbnail image of the white sedan (St3). For example, the client terminal 90 displays the analysis result of the vehicle, obtained from the video captured by the intersection camera 10 and the analysis result of the vehicle, obtained from the video captured by the vehicle capturing camera 20, which are associated with each other (see FIG. 11).

The client terminal 90 generates a candidate report of the escaping vehicle using the vehicle search result sent from the vehicle search server 60 as operated by the operator. The candidate report includes, for example, a plurality of combinations containing a date and a location (that is, the intersection), at which the incident has occurred, a thumbnail image of a candidate vehicle for the escaping vehicle, and a direction in which the vehicle has fled in the corresponding intersection. The client terminal 90 sends the candidate report of the escaping vehicle, as operated by the operator, to a police terminal T10 (see FIG. 2) held by a police officer (officer on duty) who has rushed to the scene of the incident (St4). The police terminal T10 displays the candidate report of the escaping vehicle sent from the client terminal 90. The officer on duty asks the witness to visually confirm the candidate report of the escaping vehicle. In a case where one of the candidate vehicles is selected by the witness, the officer on duty operates the police terminal T10 to determine the candidate vehicle selected by the witness as the vehicle of interest (that is, escaping vehicle) and to send to the client terminal 90 information on the escaping vehicle (for example, the thumbnail image of the vehicle listed in the candidate report). The information on the escaping vehicle stated above may be sent as follows from the police terminal T10 to the client terminal 90 as operated by the officer on duty. For example, the officer on duty listens oral statement about the candidate report visually confirmed by the witness and delivers the result (for example, identification information, e.g. a thumbnail number, for the thumbnail image of the escaping vehicle selected by the witness) to the operator via a telephone or email.

The client terminal 90 specifies the analysis result of the license plate and the occupant of the escaping vehicle, out of the vehicle search results sent from the vehicle search server 60, based on the information on the escaping vehicle visually confirmed by the witness. Consequently, the operator can take in the license plate and a face image of the occupant (that is, the suspect, or the suspect and his/her companion), of the escaping vehicle (St5). The client terminal 90 sends a search request including specified result of the license plate of the escaping vehicle and the analysis result of the occupant to each of a face search server 70 and an LPR search server 80. Further, the client terminal 90 also accesses each of a stolen vehicle database D12 and a vehicle license database D13, and searches for an owner of the escaping vehicle (St6-1). Accordingly, the client terminal 90 acquires information on the owner of the escaping vehicle (for example, whether or not vehicle theft has been reported, a registered license, ID information of the escaping vehicle, and vehicle investigation information on the escaping vehicle). In addition, the client terminal 90 accesses a blacklisted face database D11, and checks whether or not the face image of the occupant in the escaping vehicle is registered in the blacklist (St6-3). The term "blacklist" means, for example, data in which personal information of ex-convicts, including face images, who committed a crime in past, is classified and registered for each case that they involved. Moreover, in step St6-3, the processing may be carried out on the client terminal 90, or carried out by the face search server 70 using the blacklist stored in a database 71 of the face search server 70.

Figure 14:
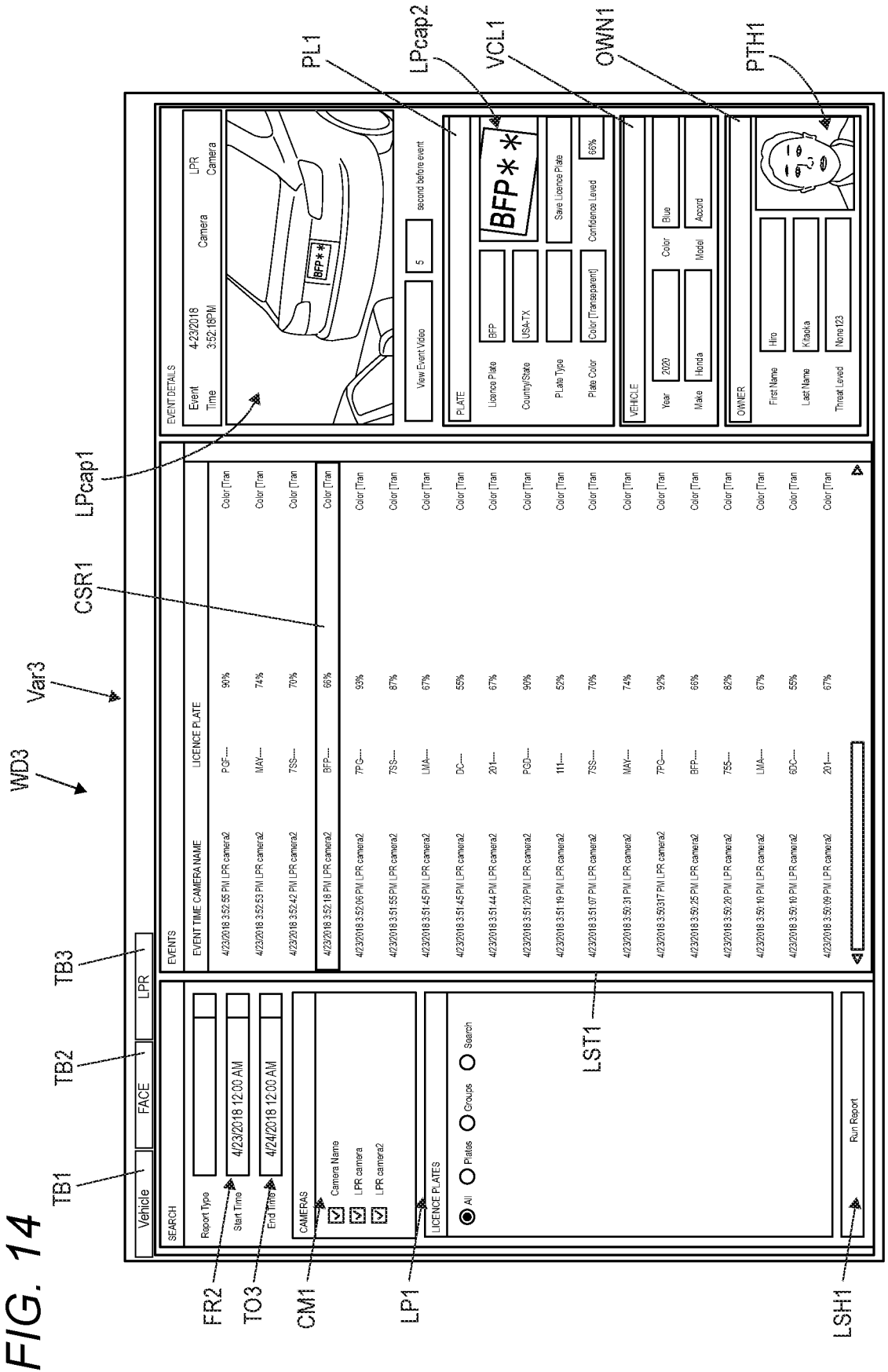
FIG. 14 is a diagram illustrating an example of an LPR search display region.

The LPR search server 80 searches for the escaping vehicle (LPR search) based on the license plate of the escaping vehicle in response to the search request sent from the client terminal 90 (St6-2, see FIG. 14). The results of the various searches in steps St6-1, St6-2 and St6-3 are returned to the client terminal 90. Therefore, the operator is able to determine whether or not the escaping vehicle used by the suspect of the incident is held by its owner or reported as stolen, and also to specify the suspect of the incident or the suspect's face in detail (St7).

Subsequently, the client terminal 90 sends to the face search server 70 a search request for searching the face image of the suspect in order to chase the suspect using the face image of the suspect as operated by the operator, such that, for example, the police officer can be notified of real-time alert based on the face image of the suspect who is fleeing by face search (in other words, a trap to arrest the suspect is placed using the face search) (St8-1). Further, the client terminal 90 sends to the LPR search server 80 a search request for searching the escaping vehicle in order to chase the escaping vehicle used by the suspect using its license plate, such that, for example, the police officer can be notified of real-time alert based on the license plate of the escaping vehicle used by the suspect who is fleeing by license plate search, as operated by the operator (in other word, a trap to arrest the suspect is placed using the license plate search) (St8-2). Consequently, the client terminal 90 can estimate or specify a current location of the suspect or the escaping vehicle with high accuracy based on the results returned from the face search server 70 and the LPR search server 80, using feature information such as the face image of the suspect or the license plate of the escaping vehicle (St9). In other words, the operator is able to properly notify the officer on duty or on the way of whereabouts of the suspect or the escaping vehicle, and the investigation can be more efficient.

Figure 2:
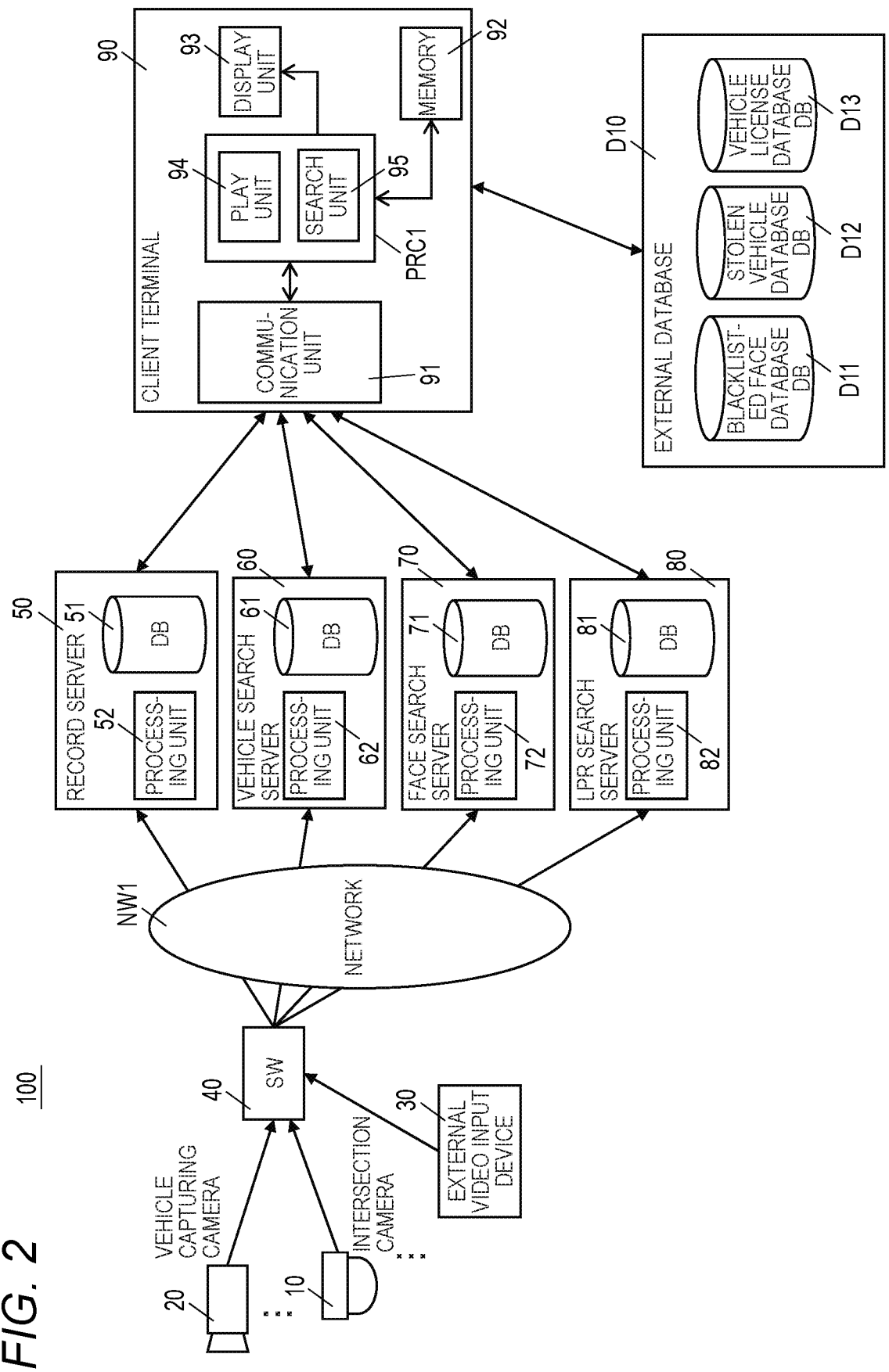
FIG. 2 is a block diagram illustrating an example of a system configuration of the investigation assist system.

FIG. 2 is a block diagram illustrating an example of a system configuration of the investigation assist system 100. The investigation assist system 100 includes the intersection camera 10, the vehicle capturing camera 20, an external video input device 30, a record server 50, the vehicle search server 60, the face search server 70, the LPR search server 80, the client terminal 90, and an external database D10. The record server 50, the vehicle search server 60, the face search server 70, and the LPR search server 80 constitute a server cluster SV of the investigation assist system 100, which may be provided as an on-premises server in the police station or as a cloud server connected to a network such as Internet.

According to FIG. 2, a single server cluster SV and a single client terminal 90 are installed in the police station; however, multiple server clusters and multiple client terminals may be provided. The investigation assist system 100 may be used over a plurality of precincts for joint investigation instead of being used in a single precinct.

Figure 3:
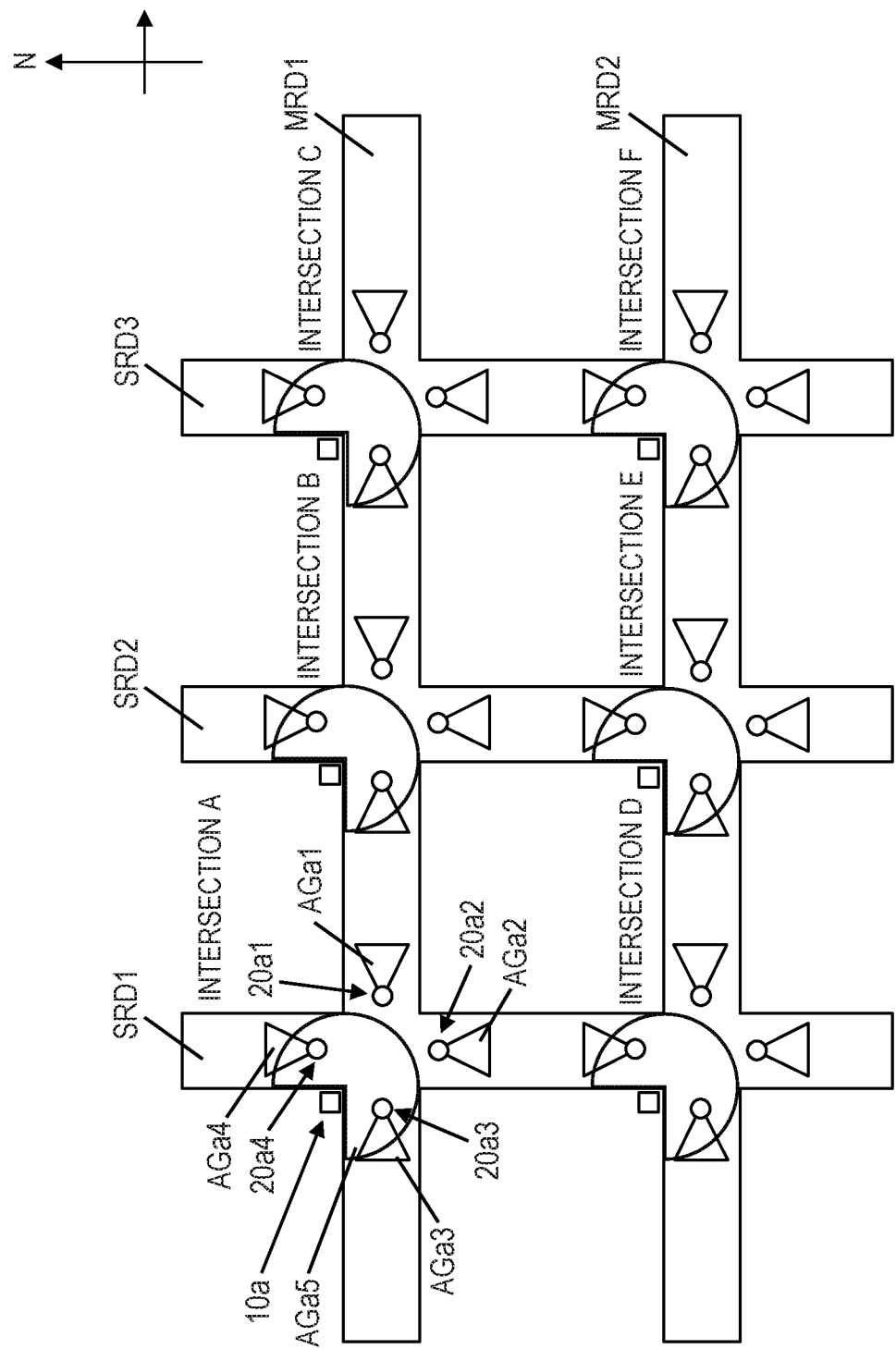
FIG. 3 is a diagram schematically illustrating an example of an arrangement of an intersection camera and a vehicle capturing cameras.

In the investigation assist system 10X), a plurality of cameras (in particular, the intersection camera 10 with one or more vehicle capturing cameras 20) are installed at each intersection as a group (see FIG. 3). That is, a plurality of intersection cameras 10 and a plurality of vehicle capturing cameras 20 are provided. The groups of cameras may be arranged only at intersections of main arterial roads, such as national highways or prefectural highways instead of being arranged at all intersections. The intersection camera 10 and the vehicle capturing cameras 20 each are communicably connected to the server cluster SV via a network switch 40 and a network NW1 such as a communication link of Internet. The network NW1 is constituted by a wired communication link (for example, optical communication network using optical fibers), but may be constituted by a wireless communication network.

The intersection camera 10 and the vehicle capturing cameras 20 respectively send captured video to the server cluster SV via the network switch 40 and the network NW1. In the following description, the captured video includes identification information of the camera capturing the video (in other words, location information of an intersection where the corresponding camera is installed) and a time stamp of date when the video has been captured.

Hereinbelow, an exemplified arrangement of the cameras for each intersection will be explained briefly with reference to FIG. 3. FIG. 3 is a diagram schematically illustrating an example of the arrangement of the intersection camera 10 and the vehicle capturing cameras 20. FIG. 3 shows intersections A, B and C, each of where a north main arterial road MRD1 and east-west service roads SRD1, SRD2 and SRD3 cross each other, and intersections D, E and F, each of where a south main arterial road MRD2 and the east-west service roads SRD1, SRD2 and SRD3 cross each other.

One intersection camera 10 is arranged at each of the intersections A, B, C, D, E and F, as an example of a camera (first camera). For example, in a case of the intersection A, the intersection camera 10a is fixedly installed on a pole (not shown) standing at a corner of the intersection A, and constantly images the intersection A with an angle of view AGa5 of, for example, 270 degrees. In addition, the same applies to each of the other intersections B, C, D, E and F; the intersection camera is installed at a corner of each intersection B, C, D, E and F and constantly captures the intersection B, C, D, E or F with the angle of view of, for example, 270 degrees. A direction of each intersection camera 10 is not limited to a direction shown in FIG. 3 and may be any direction. Consequently, the intersection camera 10 can appropriately image a vehicle even if a license plate is not disposed in front of the vehicle as long as it is arranged, for example, to capture the intersection.

Four vehicle capturing cameras 20 are arranged at each of the intersections A, B, C, D, E and F, as an example of a camera (second camera). For example, at the intersection A, the vehicle capturing camera 20*a*1 is fixedly installed on an L-shaped pole (not shown) standing at a shoulder of the main arterial road MRD1, and constantly captures a license plate and an occupant's face of a vehicle entering the intersection A from the east with an angle of view AGa1. The vehicle capturing camera 20*a*2 is fixedly installed on an L-shaped pole (not shown) standing at a shoulder of the service road SRD1, and constantly captures a license plate and an occupant's face of a vehicle entering the intersection A from the south with an angle of view AGa2. The vehicle capturing camera 20*a*3 is fixedly installed on an L-shaped pole (not shown) standing at the shoulder of the service road SRD1, and constantly captures a license plate and an occupant's face of a vehicle entering the intersection A from the west with an angle of view AGa3. The vehicle capturing camera 20*a*4 is fixedly installed on an L-shaped pole (not shown) standing at the shoulder of the main arterial road MRD1, and constantly captures a license plate and an occupant's face of a vehicle entering the intersection A from the north with an angle of view AGa4. The same applies to the other intersections B, C, D, E and F, and the details will be omitted. A direction of each vehicle capturing camera 20 is not limited to a direction shown in FIG. 3 and may be any direction. Consequently, the vehicle capturing cameras 20 can appropriately image a vehicle even if a license plate is not disposed in front of the vehicle as long as they are arranged, for example, to capture the intersection.

The external video input device 30 irregularly inputs and holds captured videos of external cameras (for example, a smartphone or a video camera held by a resident), other than the intersection camera 10 or the vehicle capturing cameras 20. The external video input device 30 sends to the server cluster SV the captured videos held therein, via the network switch 40 and the network NW1.

The network switch 40 has a function of a router, and relays transmission and reception of data or information between the network NW1 and each of the intersection cameras 10, the vehicle capturing cameras 20 and the external video input devices 30. In FIG. 2, the network switch is marked as "SW" for convenience.

The record server 50 is installed in, for example, the police station, and is configured to include at least a database 51 and a processing unit 52. The record server 50 receives and acquires the captured video sent from each of the intersection cameras 10 and the vehicle capturing camera 20*a*, installed at some or all of the intersections in the police precinct, by the processing unit 52, and stores (backups) the videos in the database 51. In FIG. 2, the database is marked as "DB" for convenience. The record server 50 may send the captured video stored in the database 51 to the client terminal 90 in response to the request sent from the client terminal 90 as operated by the operator in the police station. Each server in the server cluster SV and the client terminal 90, installed in the police station, are communicably connected to each other via a network such as internet of the police station.

The vehicle search server 60 as an example of the server is installed in, for example, the police station, and is configured to include at least a database 61 and a processing unit 62. The vehicle search server 60 receives and acquires the captured video sent from each of the intersection cameras 10 and the vehicle capturing cameras 20, installed at some or all of the intersections in the police precinct, by the processing unit 62. Every time when receiving the captured video sent from each of the intersection camera 10 and the vehicle capturing cameras 20, the vehicle search server 60 carries out a video analysis to extract information on a vehicle appeared in the captured video, and stores the analysis result in the database 61. According to the video analysis, it is possible to acquire, for example, tag information related to the video (for example, information on model, type and color of a vehicle appeared in the captured video), a date when the video used for video analysis has been captured, and identification information of a camera capturing the video. The vehicle search server 60 may store the captured video associated with and added to the tag information in the database 61. The analysis result stored in the database 61 is, for example, referred when searching for whether or not there is a vehicle satisfying the search conditions (see FIGS. 8 to 10) included in a vehicle information request sent from the client terminal 90 in a case where the incident has occurred.

The face search server 70 as an example of the server is installed in, for example, the police station, and is configured to include at least a database 71 and a processing unit 72. The face search server 70 receives and acquires the captured video sent from each of the intersection cameras 10 and the vehicle capturing cameras 20, installed at some or all of the intersections in the police precinct, by the processing unit 72. Every time when receiving the captured video sent from each of the intersection camera 10 and the vehicle capturing cameras 20, the face search server 70 carries out a video analysis to extract a face image of a person appeared in the captured video, and stores the analysis result in the database 71. According to the video analysis, it is possible to acquire, for example, a face image of a person appeared in the captured video, a date when the video used for video analysis has been captured, and identification information of a camera capturing the video. The face search server 70 may store the captured video associated with and added to the analysis result in the database 71. The analysis result stored in the database 71 is, for example, referred when searching for whether or not there is a person satisfying the search conditions (see FIG. 13) included in a face information request sent from the client terminal 90 in a case where the incident has occurred. The database 71 holds, for example, blacklist data in which personal information of ex-convicts, including face images, who committed a crime in past, is classified and registered for each case that they involved.

The LPR search server 80 as an example of the server is installed in, for example, the police station, and is configured to include at least a database 81 and a processing unit 82. The LPR search server 80 receives and acquires the captured video sent from each of the intersection cameras 10 and the vehicle capturing cameras 20, installed at some or all of the intersections in the police precinct, by the processing unit 82. Every time when receiving the captured video sent from each of the intersection camera 10 and the vehicle capturing cameras 20, the LPR search server 80 carries out a video analysis to extract a license plate image of a vehicle appeared in the captured video, and stores the analysis result in the database 81. According to the video analysis, it is possible to acquire, for example, a license plate image of a vehicle appeared in the captured video, a date when the video used for video analysis has been captured, and identification information of a camera capturing the video. The LPR search server 80 may store the captured video associated with and added to the analysis result in the database 81. The analysis result stored in the database 81 is, for example, referred when searching for whether or not there is a license plate satisfying the search conditions (see FIG. 14) included in a license plate information request sent from the client terminal 90 in a case where the incident has occurred.

The client terminal 90 is installed in, for example, the police station, used by the police operator in the police station, and constituted using, for example, a laptop or desktop PC (personal computer). In a case where the incident has occurred, the operator receives a call from a person (for example, witness) who reports to the police station that the incident has occurred, listens various information (eyewitness information) related to the incident, and records the information by operating the client terminal 90. The client terminal 90 is not limited to the PC stated above, and may be, for example, a computer having a communication function such as a smartphone, a tablet terminal, or a PDA (personal digital assistant). The client terminal 90 sends to the vehicle search server 60 the vehicle information request to allow the vehicle search server 60 to search for, for example, a vehicle matching the eyewitness information (that is, the escaping vehicle used by the suspect), receives the search result, and displays the result on a display unit 93.

The client terminal 90 includes a communication unit 91, a memory 92, the display unit 93, and a processor PRC1. Although not shown in FIG. 2, the client terminal 90 may be connected to an operation unit (for example, mouse or keyboard) for receiving the operation of the operator. In a case where, for example, the operator wants to check the video captured at the date and the location, at which the incident (case) has occurred, the operator inputs the search conditions including the date, the location and the vehicle's features to the client terminal 90 using the operation unit (not shown).

The communication unit 91 communicates with the server cluster SV connected via the network such as intranet, or the police terminal T10 connected via the network NW2 such as Internet.

The memory 92 is constituted using, for example, a RAM (random access memory) and a ROM (read only memory), stores a program required for executing the operation of the client terminal 90, and temporarily saves data or information generated during the operation.

The RAM is, for example, a work memory used when the processor PRC1 runs. The ROM stores, for example, a program for controlling the processor PRC1 in advance. The memory 92 may also include, for example, a hard disk drive or a solid state drive. The memory 92 records road map information indicating a location at which each of the intersection cameras 10 and the vehicle capturing cameras 20 is installed. The memory 92 also records updated road map information every time when the road map is updated due to new construction or maintenance work. Further, the memory 92 records intersection camera installation data indicating a correlation between information on an intersection, and the intersection camera 10 and one or more vehicle capturing cameras 20, which are correspondingly installed at such an intersection. In the intersection camera installation data, for example, identification information of the intersection is associated with identification information of the camera. Therefore, the client terminal 90 can determine the date when the video has been captured, the camera information and the intersection information, based on the various search results or the captured video sent from the server cluster SV.

The display unit 93 is constituted using, for example, a display device such as an LCD (liquid crystal display) or an organic EL (electroluminescence), and displays various data sent from the processor PRC1.

The processor PRC1 is constituted using, for example, a CPU (central processing unit), a DSP (digital signal processor), or an FPGA (field programmable gate array), and serves as a control unit of the client terminal 90 to carry out control processing for entirely controlling the operation of each unit in the client terminal 90, input/output processing of data between the units in the client terminal 90, computation processing of data, and storage processing of data. The processor PRC1 operates in accordance with the program stored in the memory 92. The processor PRC1 uses the memory 92 during the operation, and displays on the display unit 93 the search result or the captured video data, sent from the server cluster SV Further, the processor PRC1 generates an information acquisition request including the search conditions input by the operation unit (not shown), and sends the information acquisition request to the corresponding server of the server cluster SV via the communication unit 91.

The processor PRC1 functionally implements a play unit 94 and a search unit 95 by reading and executing the program stored in the memory 92. The play unit 94 outputs to the display unit 93 the captured video data sent from the record server 50 and plays the data as operated by the operator. The search unit 95 generates the information acquisition request including the search conditions input as operated by the operator.

The police terminal T10 is a wireless communication terminal held by an officer on patrol, which is present at a scene of the incident, which is constituted using, for example, a PC, a smartphone or a tablet terminal. The police terminal T10 is connected to the client terminal 90 via the network NW2 such as Internet so as to transmit and receive the data to and from the client terminal 90. The police terminal T10 has a display device, receives the candidate report (see FIG. 1) sent from the client terminal 90, and displays the report on the display device.

The external database D10 is, for example, a database managed by external organizations other than the police station, which permits access from the client terminal 90 in the police station. The external database D10 is configured to include the blacklisted face database D11, the stolen vehicle database D12 and the vehicle license database D13. The data stored in various databases in the external database D10 is appropriately updated, e.g. added or deleted.

The blacklisted face database D11 stores, for example, a blacklist in which personal information of ex-convicts, including face images, who committed a crime in past, is classified and registered for each case that they involved. The blacklisted face database D11 is referred upon checking the blacklist, in a case where it is determined that the face image of the occupant, e.g. a driver, in the escaping vehicle does not match the face image of the owner of the escaping vehicle, in order to find who the occupant is.

The stolen vehicle database D12 stores, for example, a stolen vehicle list including information on a vehicle reported as stolen (that is, so-called stolen vehicle). The stolen vehicle database D12 is referred to, for example, specify whether or not the escaping vehicle is reported as stolen in a case where the license plate of the escaping vehicle is visually and apparently confirmed by the witness.

The vehicle license database D13 as an example of the owner database stores, for example, an owner list including owner information in which personal information of the owner (for example, name, face image and address) is associated with vehicle information (for example, model, color and type) for each vehicle. The vehicle license database D13 is referred to, for example, specify the owner information including the face image of the owner of the escaping vehicle in a case where the license plate of the escaping vehicle is visually and apparently confirmed by the witness.

Figure 4:
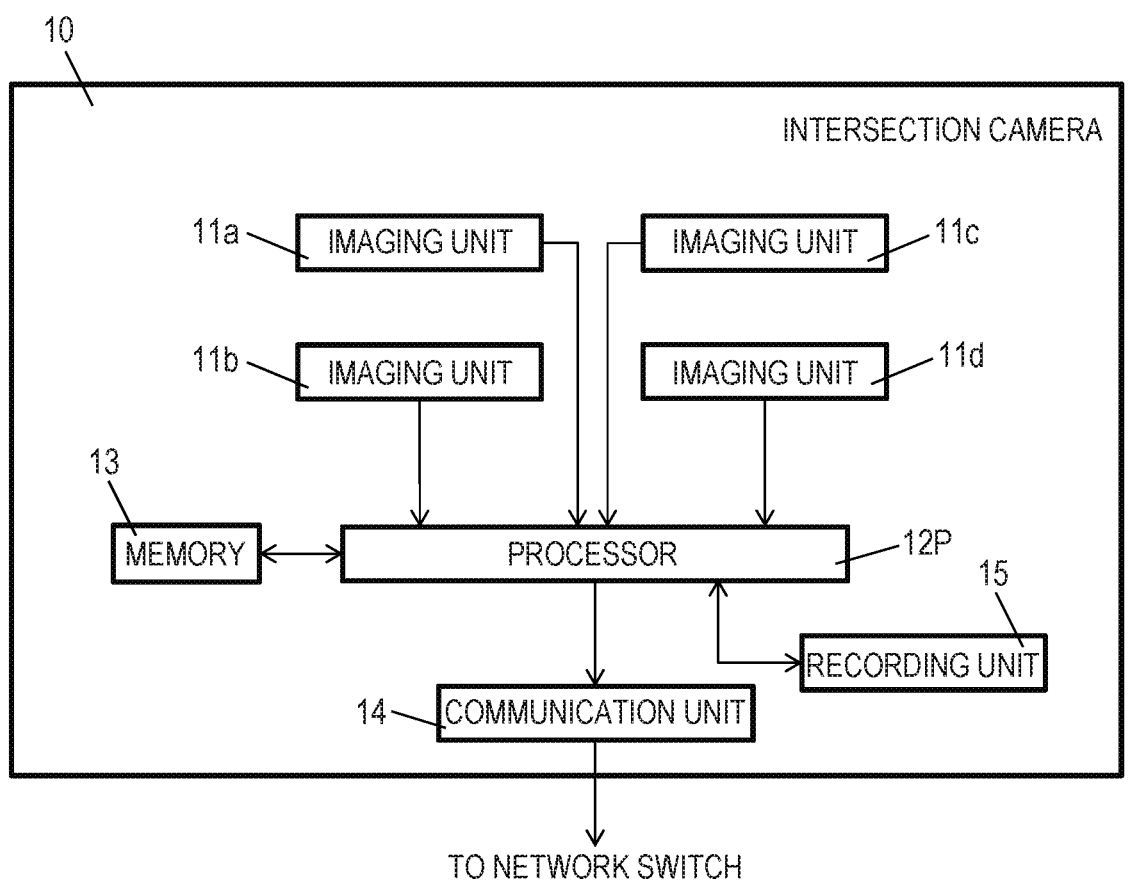
FIG. 4 is a block diagram illustrating an example of a hardware configuration of the intersection camera.

FIG. 4 is a block diagram illustrating an example of a hardware configuration of the intersection camera 10. As illustrated in FIG. 4, the intersection camera 10 is configured to include four imaging units 11a, 11b, 11c and 11d, a processor 12P, a memory 13, a communication unit 14, and a recording unit 15. The intersection camera 10 is a multi-sensor camera which is capable of capturing the intersection with the angle of view of 270 degrees using, for example, the imaging units 11a to 11c, out of four imaging units 11a to 11d, and capable of capturing a lower part (directly below) of installation position of the intersection camera 10 using one remaining imaging unit. In other words, the entire intersection is captured by the imaging units 11a to 11c with the angle of view of 270 degrees, and a range corresponding to a blind spot of the angle of view of the imaging units 11a to 11c (for example, a region vertically below the installation position of the intersection camera 10 in which pedestrians walk) is captured by the imaging unit 11d.

The imaging units 11a to 11d have the same configuration, thus the imaging unit 11a will be described as an example. The imaging unit 11a is configured to include a condensing lens, and a solid-state imaging element such as a CCD (charge coupled device) imaging sensor or a CMOS (complementary metal oxide semiconductor) imaging sensor.

While the intersection camera 10 is turned on, the imaging unit 11a usually outputs to the processor 12P the captured video data of a subject, which is obtained based on capturing carried out by the solid-state imaging element. Additionally, the imaging units 11a to 11d each have a mechanism for varying zoom magnification upon capturing.

The processor 12P is constituted using, for example, a CPU, a DSP or an FPGA. The processor 12P serves as a control unit of the intersection camera 10 to carry out control processing for entirely controlling the operation of each unit in the intersection camera 10, input/output processing of data between the units in the intersection camera 10, computation processing of data, and storage processing of data. The processor 12P operates in accordance with the program stored in the memory 13. The processor 12P carries out various known image processing on the captured video data captured by the imaging unit 11a using the memory 13 during the operation, and records the data in the recording unit 15. Although not illustrated in FIG. 4, in a case where the intersection camera 10 has a GPS (global positioning system) receiver, the processor 12P may acquire current position information from the GPS receiver and may record the captured video data further associated with the position information.

Hereinbelow, the GPS receiver will be briefly described. The GPS receiver receives satellite signals from a plurality of GPS transmitters (for example, four navigation satellites), including a time when each signal is transmitted and a position coordinate of each GPS transmitter. The GPS receiver calculates the current position coordinate of the camera and a time when the satellite signals are received using the plurality of satellite signals. The calculation may be carried out by the processor 12P to which the output from the GPS receiver is input, instead of the GPS receiver. The information on the time when the satellite signals are received may be used also to correct a system time of the camera. The system time is used, for example, to record a capturing time of a captured image constituting the captured video.

The processor 12P may variably control capturing conditions (for example, zoom magnification) of the imaging units 11a to 11d in accordance with an external control command received by the communication unit 14. For example, in a case where varying the zoom magnification is instructed by the external control command, the processor 12P varies the zoom magnification of the imaging unit designated by the control command upon capturing in accordance with the control command.

The processor 12P sends repeatedly the captured video data stored in the recording unit 15 to the server cluster SV via the communication unit 14. The term "repeatedly sending" is not limited to transmission every time a predetermined fixed period of time has elapsed, but may encompass transmission every time a predetermined irregular period (instead of fixed period) of time has elapsed, and multiple transmissions.

The memory 13 is constituted using, for example, a RAM and a ROM, stores a program required for executing the operation of the intersection camera 10, and temporarily saves data or information generated during the operation. The RAM is, for example, a work memory used when the processor 12P runs. The ROM stores, for example, a program for controlling the processor 12P in advance.

The communication unit 14 sends the captured video recorded in the recording unit 15 to the server cluster SV via the network switch 40 and the network NW1 based on the instruction of the processor 12P.

The recording unit 15 is constituted using an external storage medium such as a semiconductor memory (for example, flash memory) built in the intersection camera 10 or a memory card (for example, SD card) not built in the intersection camera 10. The recording unit 15 records the captured video generated by the processor 12P in association with the identification information of the intersection camera 10 and the information on a data when the video has been captured. The recording unit 15 usually prebuffers and holds the captured video data for a predetermined time (for example, 30 seconds), and new captured video data is kept to overwritten and saved on the old captured video of a predetermined time (for example, 30 seconds) before the current time. Additionally, the recording unit 15 is constituted by a memory card, the recording unit 15 is detachably attached to a housing of the intersection camera 10.

Figure 5:
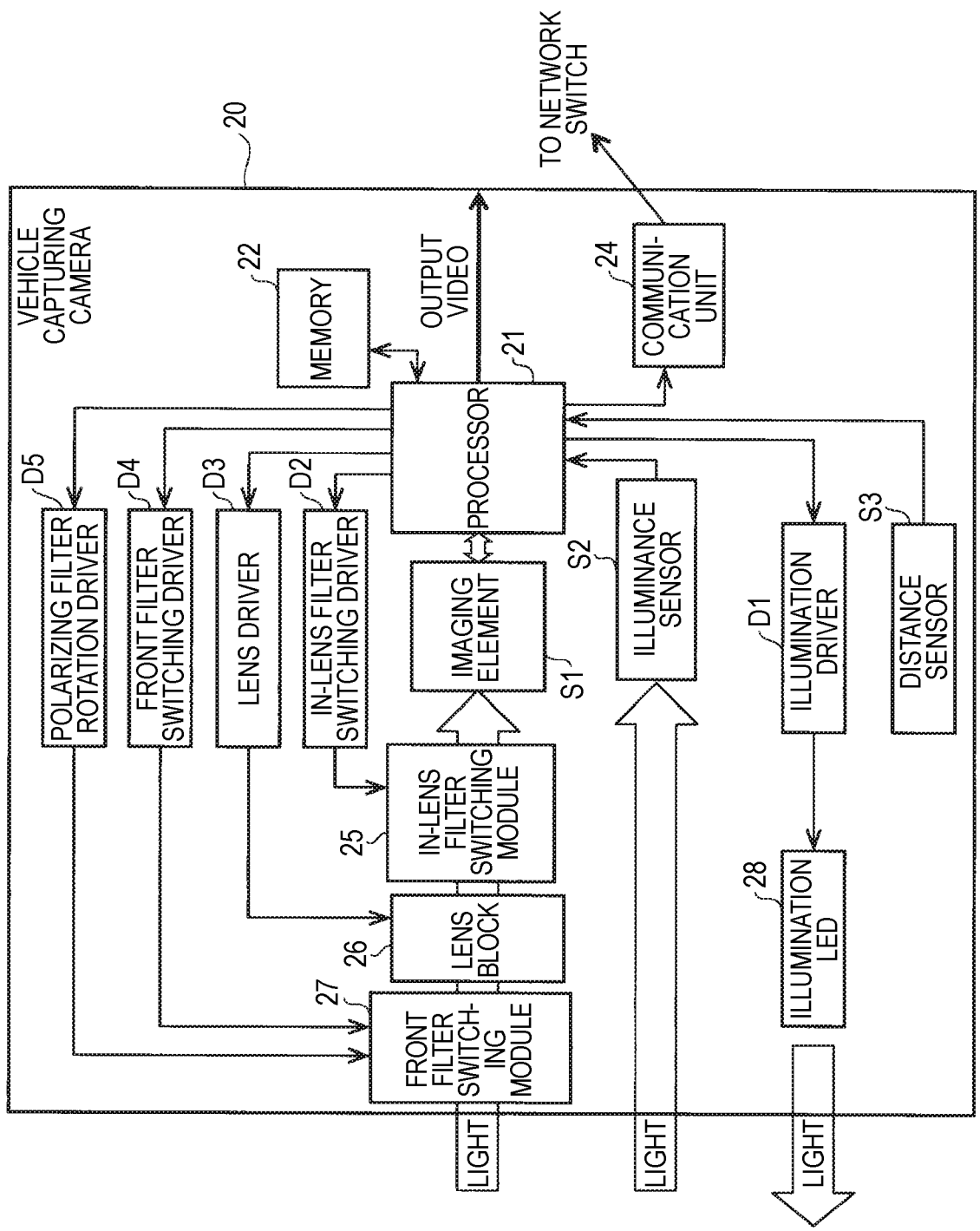
FIG. 5 is a block diagram illustrating an example of a hardware configuration of the vehicle capturing camera.

FIG. 5 is a block diagram illustrating an example of a hardware configuration of the vehicle capturing camera 20. The vehicle capturing camera 20 is configured to include a processor 21, a memory 22, an imaging element S1, an illuminance sensor S2, an illumination driver D1, an in-lens filter switching driver D2, a lens driver D3, a front filter switching driver D4, a polarizing filter rotation driver D5, a communication unit 24, and a distance sensor S3.

The processor 21 is constituted using, for example, a CPU, a DSP or an FPGA. The processor 21 serves as a control unit of the vehicle capturing camera 20 to carry out control processing for entirely controlling the operation of each unit in the vehicle capturing camera 20, input/output processing of data between the units in the vehicle capturing camera 20, computation processing of data, and storage processing of data. The processor 21 operates in accordance with the program stored in the memory 22. The processor 21 uses the memory 22 during the operation and temporarily stores data or information generated or acquired by the processor 21 in the memory 22.

The memory 22 is constituted using, for example, a RAM and a ROM, stores a program required for executing the operation of the vehicle capturing camera 20, and temporarily holds data or information generated during the operation. The RAM is, for example, a work memory used when the vehicle capturing camera 20 runs. The ROM stores and holds, for example, a program for controlling the vehicle capturing camera 20 in advance.

The imaging element S1 is an imaging sensor capable of capturing a high definition image such as 2K, 4K or 8K, and is constituted by, for example, a solid-state imaging element such as a CCD or a CMOS. The solid-state imaging element generates an electrical signal corresponding to the captured image based on a photoelectrically converted optical image formed on an imaging surface. Further, the imaging device S1 may include an amplifier for amplifying the electric signal output from the solid-state imaging element, and a gain adjusting unit capable of adjusting gain (sensitivity) of the amplifier. The output of the imaging element S1 is input to the processor 21 and predetermined signal processing is executed to generate the captured video data.

The illuminance sensor S2 detects illuminance of the environment around the vehicle capturing camera 20. For example, a photodiode or a phototransistor is used in the illuminance sensor S2. The illuminance sensor S2 is attached to the front of a housing of the vehicle capturing camera 20 so as to detect the illuminance of the environment in a direction in which the vehicle is present as a subject of the vehicle capturing camera 20. The illuminance information (in particular, illuminance value data) detected by the illuminance sensor S2 is input to the processor 21, and is used by the processor 21 to determine whether it is night or day right now.

The processor 21 determines that it is morning or daytime when the illuminance information is higher than a predetermined threshold (in other words, it is bright), and sets a daytime mode to allow the vehicle capturing camera 20 to execute daytime processing. The processor 21 determines that it is nighttime or evening when the illuminance information is higher than a predetermined threshold (in other words, it is dark), and sets a nighttime mode to allow the vehicle capturing camera 20 to execute nighttime processing. Information (for example, a flag) indicating whether the daytime mode or nighttime mode is set is temporarily held, for example, in the memory 22.

The communication unit 24 is able to communicate with the server cluster SV via the network NW1 such as a wired LAN (Local Area Network) or a wireless LAN.

The distance sensor S3 is a sensor for measuring a distance from the vehicle capturing camera 20 to the vehicle. The distance sensor S3 emits, for example, infrared light, laser light or ultrasonic waves, and calculates the distance based on a time difference until the reflected light is detected with a ToF (time-of-flight) method.

Further, the imaging element S1 may be used to measure the distance to the vehicle instead of using the distance sensor S3. For example, the processor 21 may acquire a correlation between a distance registered in advance and a size ratio, which is a size ratio of a vehicle image in the image captured by the imaging element S1, and derive the distance to the vehicle with reference to a table (not shown) held in the memory 22.

The illumination driver D1 is constituted using, for example, a switching circuit for switching on and off a plurality of illumination LEDs 28. The illumination driver D1 switches the plurality of illumination LEDs 28 between turn-on state and turn-off state in accordance with a control instruction from the processor 21. Further, the illumination driver D1 may further include, for example, a variable amplification circuit capable of adjusting light emission amount of the illumination LED 28. In this case, the illumination driver D1 can perform light control by adjusting the light emission amount of the illumination LED 28 in accordance with the control instruction from the processor 21.

The in-lens filter switching driver D2 is constituted using an electric circuit for driving an in-lens filter switching module 25. The in-lens filter switching driver D2 drives the in-lens filter switching module 25 in accordance with a control instruction from the processor 21 to arrange any one of an IR cut filter or a blank glass on an optical axis.

The in-lens filter switching module 25 is arranged behind a lens block 26 (rear surface side) and in front of the imaging element S1 (front surface side). The in-lens filter switching module 25 arranges the IR cut filter (not shown) and the blank glass (not shown) to be switchable, and alternately switches between the IR cut filter and the blank glass such that any one of those elements is arranged on the optical axis of an optical system. The in-lens filter switching module 25 arranges the IR cut filter on the optical axis in the daytime mode set, for example, in the daytime. Consequently, RGB light in which an IR band component is blocked is received by the imaging element S1 in the daytime mode, and thus it is possible to obtain a visible light image with high image quality. Meanwhile, the in-lens filter switching module 25 arranges the blank glass on the optical axis in the nighttime mode set, for example, in the nighttime. Consequently, incident light passes through the blank glass without blocking the IR band component by the IR cut filter to reach the imaging element S1 in the nighttime mode, and thus an IR image with a certain degree of brightness (in other words, the image is not too dark) can be obtained based on the incident light received by the imaging element S1.

The lens driver D3 is constituted using an electric circuit for adjusting positions of various lenses in the lens block 26. The lens driver D3 adjusts a position of a focusing lens in the lens block 26 in accordance with a control instruction from the processor 21. In a case where a zoom lens is built-in in the lens block 26, the lens driver D3 may adjust magnification of the zoom lens according to the control instruction from the processor 21.

The lens block 26 includes a focusing lens forming an optical image of the subject on the imaging surface of the imaging element S1. The lens block 26 may include a zoom lens capable of varying a focal length range from telephoto to wide angle, in addition to the focusing lens.

The front filter switching driver D4 is constituted using an electric circuit for driving a front filter switching module motor (not shown). The front filter switching driver D4 drives the front filter switching module motor (not shown) in accordance with a control instruction from the processor 21 to arrange any one of a band-pass filter or a polarizing filter on an optical axis.

A front filter switching module 27 alternately switches between the band-pass filter and the polarizing filter (for example, by sliding those filters in a horizontal direction) such that any one of those filters is arranged on the optical axis. Since the front filter switching module 27 is arranged on a subject side (front surface side) on the optical axis than the lens block 26, the front filter switching module 27 can be easily and mechanically adjusted (in other words, maintained).

The polarizing filter rotation driver D5 is constituted using an electric circuit for driving a polarizing filter rotation motor. The polarizing filter rotation driver D5 drives the polarizing filter rotation motor to rotate a polarizing axis of the polarizing filter arranged on the optical axis by a predetermined angle (that is, polarizing angle) around the optical axis, in accordance with a control instruction from the processor 21. Amount of light passing through the polarizing filter is limited by tilting the polarizing axis of the polarizing filter.

The vehicle capturing camera 20 takes the vehicle as a subject to clearly capture a face of the suspect or faces of the suspect and his/her companion in the vehicle together with the license plate of the vehicle, thereby generating and acquiring captured images of those faces and the license plate. That is, the imaging element S1 captures both the face of the person in the vehicle and the license plate, thereby generating two types of captured images corresponding to the same vehicle; one is an image mainly and clearly showing the face of the person in the vehicle, and the other is an image mainly and clearly showing the license plate. The processor 21 allows the imaging element S1 to capture videos with imaging conditions when using the imaging element S1. The imaging conditions encompass, for example, exposure time longer than standard exposure reference time and exposure time shorter than the standard exposure reference time.

In particular, the vehicle capturing camera 20 can generate a face image showing clearly and brightly the face of the person behind a windshield of the vehicle by capturing the vehicle in a state where a longer exposure time is set. In particular, the vehicle capturing camera 20 can generate a license plate image showing clearly and brightly the license plate with high glossiness by capturing the vehicle in a state where a shorter exposure time is set. That is, even though a vehicle cabin behind the windshield is dark and the face of the person in the vehicle does not show well, a bright image can be captured by the vehicle capturing camera 20 with the longer exposure time. However, the longer exposure time causes that the license plate, which is a brighter portion, is overexposed. Further, even though a portion around the license plate is glossy, an image showing a readable license plate can be captured by the vehicle capturing camera 20 with the shorter exposure time and without overexposure. Instead, the shorter exposure time causes that portions corresponding to the windshield and the face of the person in the vehicle are underexposed. As stated above, the vehicle capturing camera 20 can generate two types of captured images: a first captured image obtained with the longer exposure time in which the face image of the person in the vehicle is brightly shown, and a second captured image obtained with the shorter exposure time in which the license plate image is brightly shown.

Figure 6:
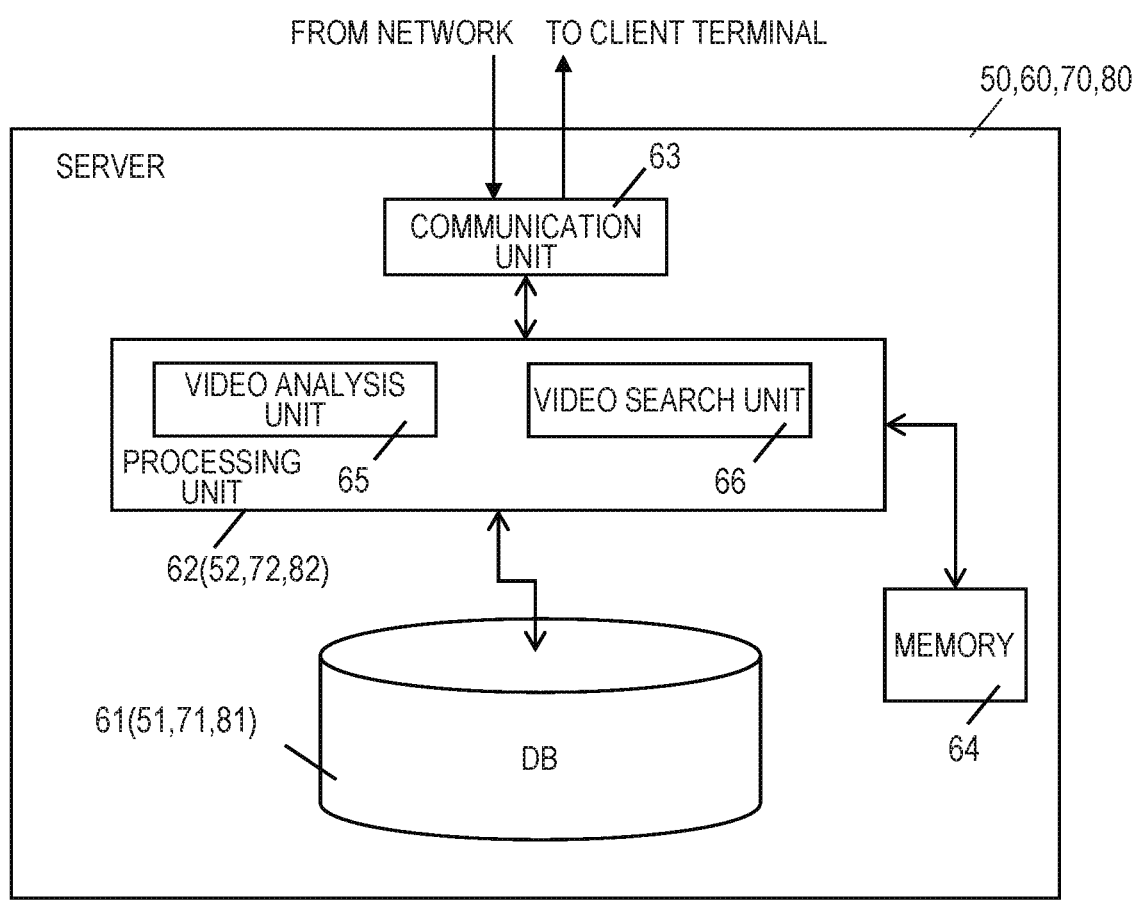
FIG. 6 is a block diagram illustrating an example of a hardware configuration common in various servers.

FIG. 6 is a block diagram illustrating an example of a hardware configuration common in various servers. Hereinbelow, the vehicle search server 60 is exemplified in the description; however, the same shall apply to configurations of other servers (that is, the record server 50, the face search server 70 and the LPR search server 80). The vehicle search server 60 is configured to include a database 61, a processing unit 62, a communication unit 63, and a memory 64.

The database 61 is constituted using, for example, a hard disk drive or a solid state drive. The database 61 records the captured video sent from each of the intersection cameras 10 and the vehicle capturing cameras 20, in association with identification information (in other words, location information on the intersection where the corresponding camera is installed) of the camera capturing such a captured video and information on date when the video has been captured. The database 61 also records road map information indicating a location at which each of the intersection cameras 10 and the vehicle capturing cameras 20 is installed. The database 61 also records updated road map information every time when the road map is updated due to new construction or maintenance work. Further, the database 61 records intersection camera installation data indicating a correlation between an intersection, and the intersection camera 10 and one or more vehicle capturing cameras 20, which are correspondingly installed at such an intersection. In the intersection camera installation data, for example, identification information of the intersection is associated with identification information of the camera.

Moreover, the database 61 stores the tag information related to the video (for example, information on model, type and color of a vehicle appeared in the captured video), acquired as the analysis result sent from a video analysis unit 65, in association with the date of the captured video, and the identification information of the camera capturing the video. This tag information is referred to, for example, upon extracting the vehicle information matching the vehicle information acquisition request sent from the client terminal 90.

The processing unit 62 is a processor which is constituted using, for example, a CPU, a DSP or an FPGA. The processing unit 62 serves as a control unit of the vehicle search server 60 to carry out control processing for entirely controlling the operation of each unit in the vehicle search server 60, input/output processing of data between the units in the vehicle search server 60, computation processing of data, and storage processing of data. The processing unit 62 operates in accordance with the program stored in the memory 64. The processing unit 62 functionally implements the video analysis unit 65 and a video search unit 66 by reading and executing the program stored in the memory 64. The video analysis unit 65 and the video search unit 66 will be described in more detail later.

The communication unit 63 communicates with each of the intersection cameras 10 and the vehicle capturing cameras 20, connected via the network NW1 such as Intranet, and receives the captured video (that is, a video showing a state of the intersection or a video showing a state of a vehicle entering the intersection) sent from each camera. Additionally, the communication unit 63 communicates with the client terminal 90 via the network such as Intranet installed in the police station to receive the information acquisition request sent from the client terminal 90 or to return a response for the information acquisition request.

The memory 64 is constituted using, for example, a RAM and a ROM, stores a program required for executing the operation of the server, and temporarily saves data or information generated during the operation. The RAM is, for example, a work memory used when the processor PRC1 runs. The ROM stores, for example, a program and data for controlling the processor PRC1 in advance.

The video analysis unit 65 carries out video analysis, for example, every time the captured video is received from each of intersection cameras 10 and the vehicle capturing cameras 20 by the vehicle search server 60, on the captured video sequentially to extract the video analysis result. For example, in a case of the vehicle search server 60, the video analysis unit 65 acquires, as the video analysis result, model, type, color, license plate and face image of the occupant (for example, the suspect of the incident, or the suspect and his/her companion) of the vehicle shown in the captured video, as well as a traveling direction when the vehicle passes through the intersection. The video analysis unit 65 can determine the traveling direction when the vehicle passes through the intersection based on, for example, temporal difference between frames of several captured images. The traveling direction indicates, for example, whether the vehicle went straight ahead, turned left, turned right, or made a U-turn at the intersection. The video analysis unit 65 records the video analysis result in association with a date and a location on and at which the video used for the video analysis has been captured, in the database 61. Consequently, the vehicle search server 60 can clearly determine a type of the vehicle shown in the captured video, a date when the video has captured, and an intersection where the video has captured.

The video search unit 66 searches for the video analysis result (see above) matching the information acquisition request for a vehicle, out of the video analysis results recorded in the database 61, based on the information acquisition request sent from the client terminal 90. The video search unit 66 extracts the video analysis result matching the information acquisition request as the vehicle search result. The video search unit 66 sends the vehicle search result to the client terminal 90 via the communication unit 63.

Subsequently, various exemplified screens displayed on the display unit 93 of the client terminal 90 will be described with reference to FIGS. 7 to 14, in the police investigation using the investigation assist system 100. In the description of FIGS. 7 to 14, the same configurations as those shown in the drawings will be designated by the same reference numerals to simplify or omit the descriptions.

In the police investigation, the client terminal 90 is launching and executing an investigation assist application (hereinafter referred to as "investigation assist app") installed in advance as operated by the operator. The investigation assist app is stored, for example, in the ROM of the memory 92 of the client terminal 90, and executed by the processor PRC1 when activated as operated by the operator. The data or information generated by the processor PRC1 during the investigation assist app is activated is temporarily held in the RAM of the memory 92.

Figure 7:
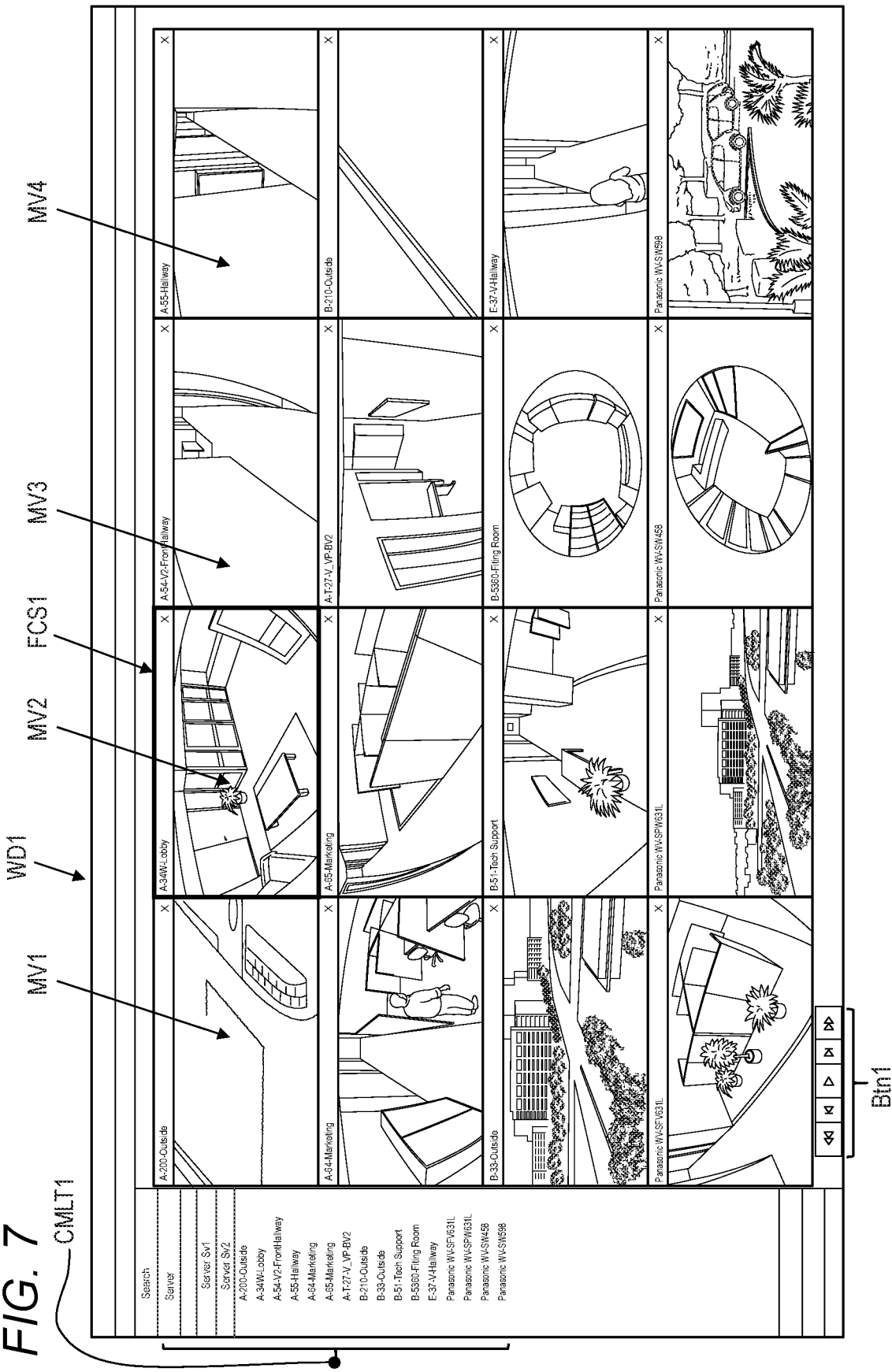
FIG. 7 is a diagram illustrating an example of a monitoring video screen.

FIG. 7 is a diagram illustrating an example of a monitoring video screen WD1. The monitoring video screen WD1 is a screen for displaying the captured video as divided into small screens, which is captured by one or more cameras (in particular, the intersection camera 10 and one or more vehicle capturing cameras 20) previously registered in each of record servers Sv1 and Sv2. The record servers Sv1 and Sv2 have the same configuration as that of the record server 50 (see FIG. 2). FIG. 7 shows each of captured videos sent from 16 cameras (for example, the intersection cameras 10 and the vehicle capturing cameras 20) previously registered in the record server Sv2.

The investigation assist app requests, for example, the record server Sv2 for the captured video of one or more cameras previously registered in the record server Sv2, as operated by the operator, generates the monitoring video screen WD1 of the captured video sent from the record server Sv2, and displays the screen on the display unit 93. Further, correlation between the cameras and the record servers is set in the investigation assist app in advance.

The monitoring video screen WD1 has a display region of a camera list CMLT1 in which one or more cameras previously registered in the record server in Sv2 are listed, a display region of display screens, for example, MV1, MV2, MV3, MV4, . . . , and MV16 showing the captured videos of maximum 16 cameras, and a display region of video operating buttons Btn1 for playing, fast-forwarding and rewinding of the display screen (for example, display screen MV2) selected as operated by the operator. When the operator selects one of the display screens with the operation, the investigation assist app display a recognizable focusing frame FCS1 indicating that this display screen is selected.

Figure 8:
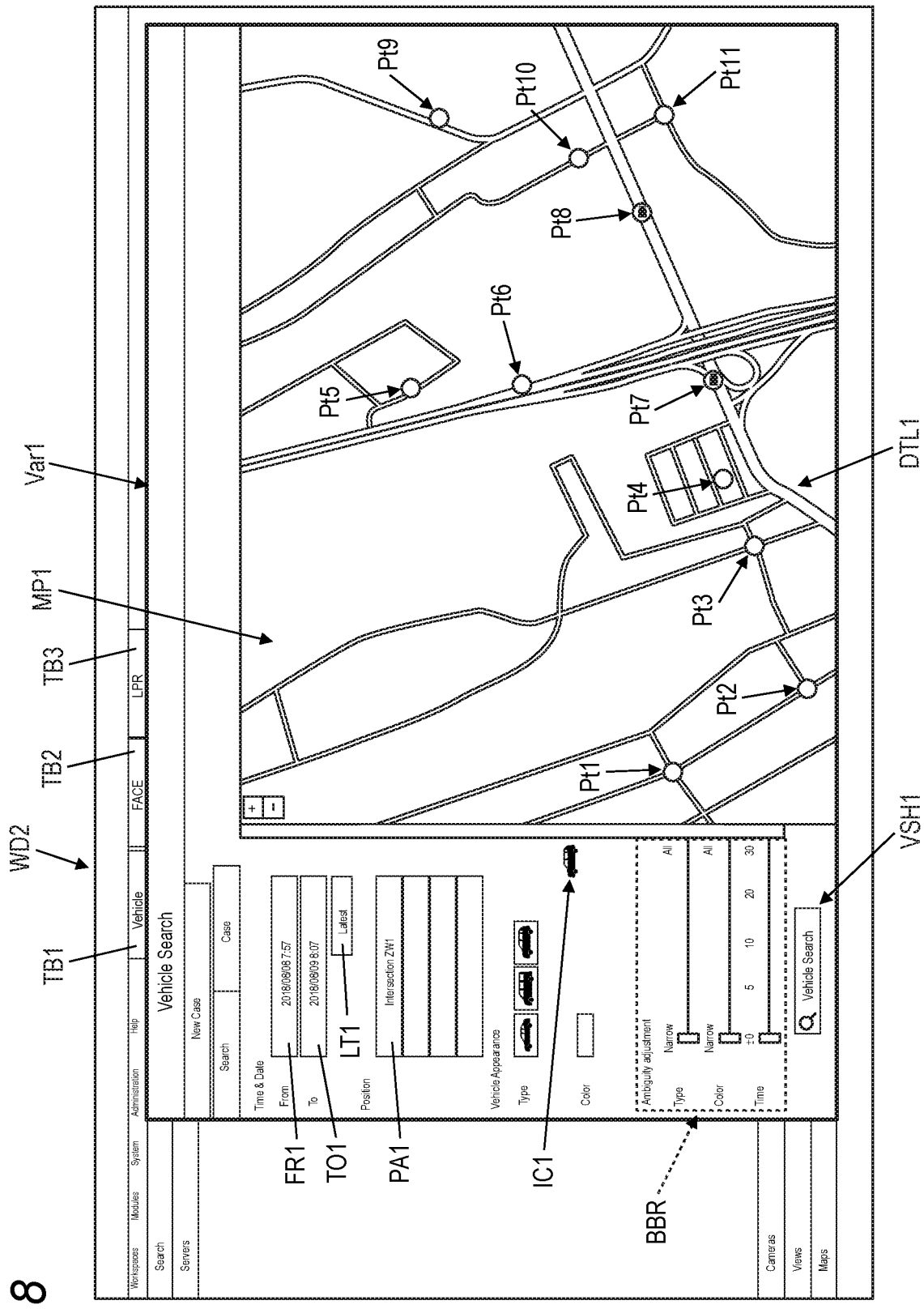
FIG. 8 is a diagram illustrating an example of a vehicle search screen.
Figure 9:
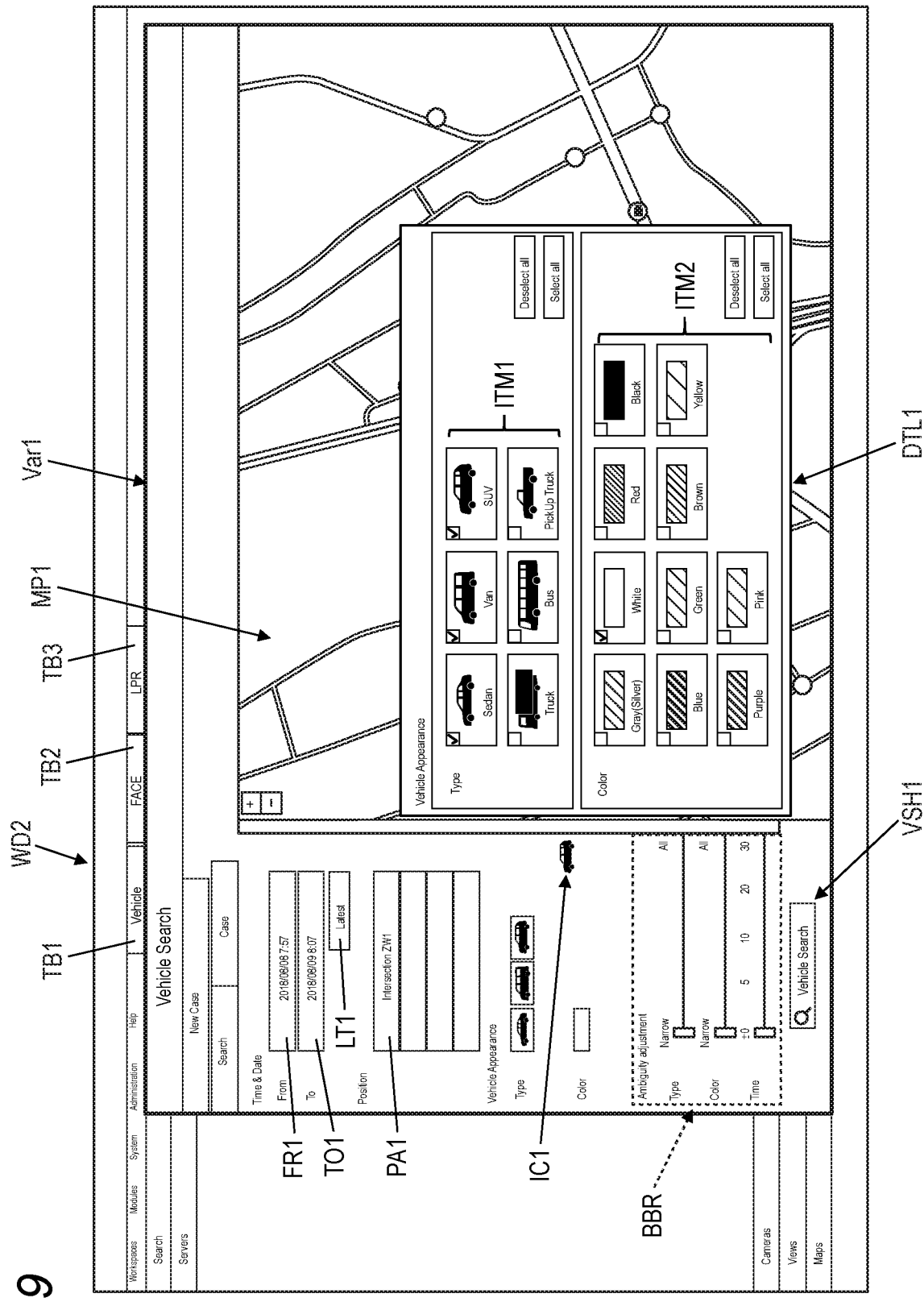
FIG. 9 is a diagram illustrating an example of the vehicle search screen on which an input window for inputting vehicle feature information is displayed.
Figure 10:
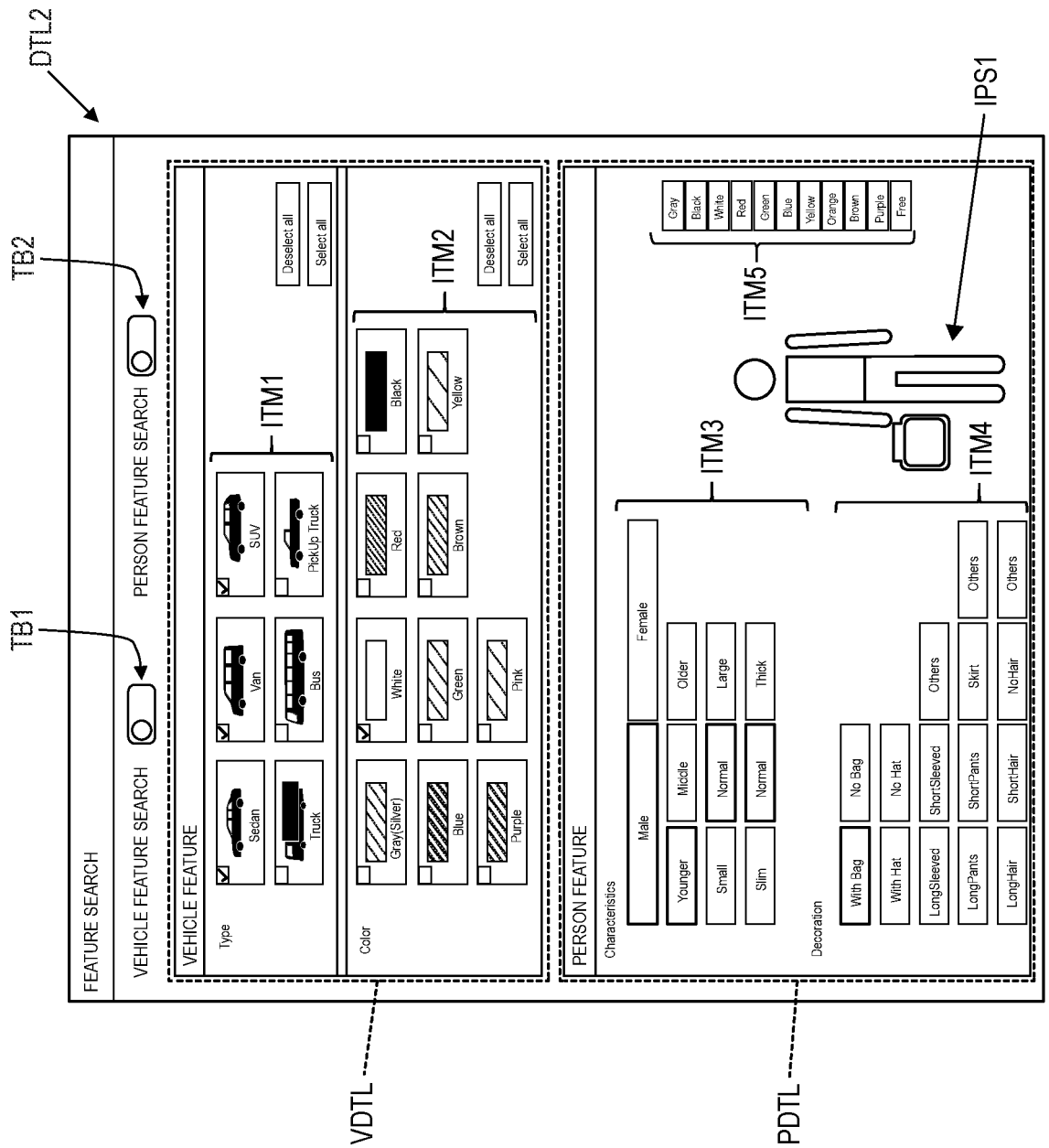
FIG. 10 is a diagram illustrating an example of a multi-input window of feature information on a vehicle and a person.
Figure 11:
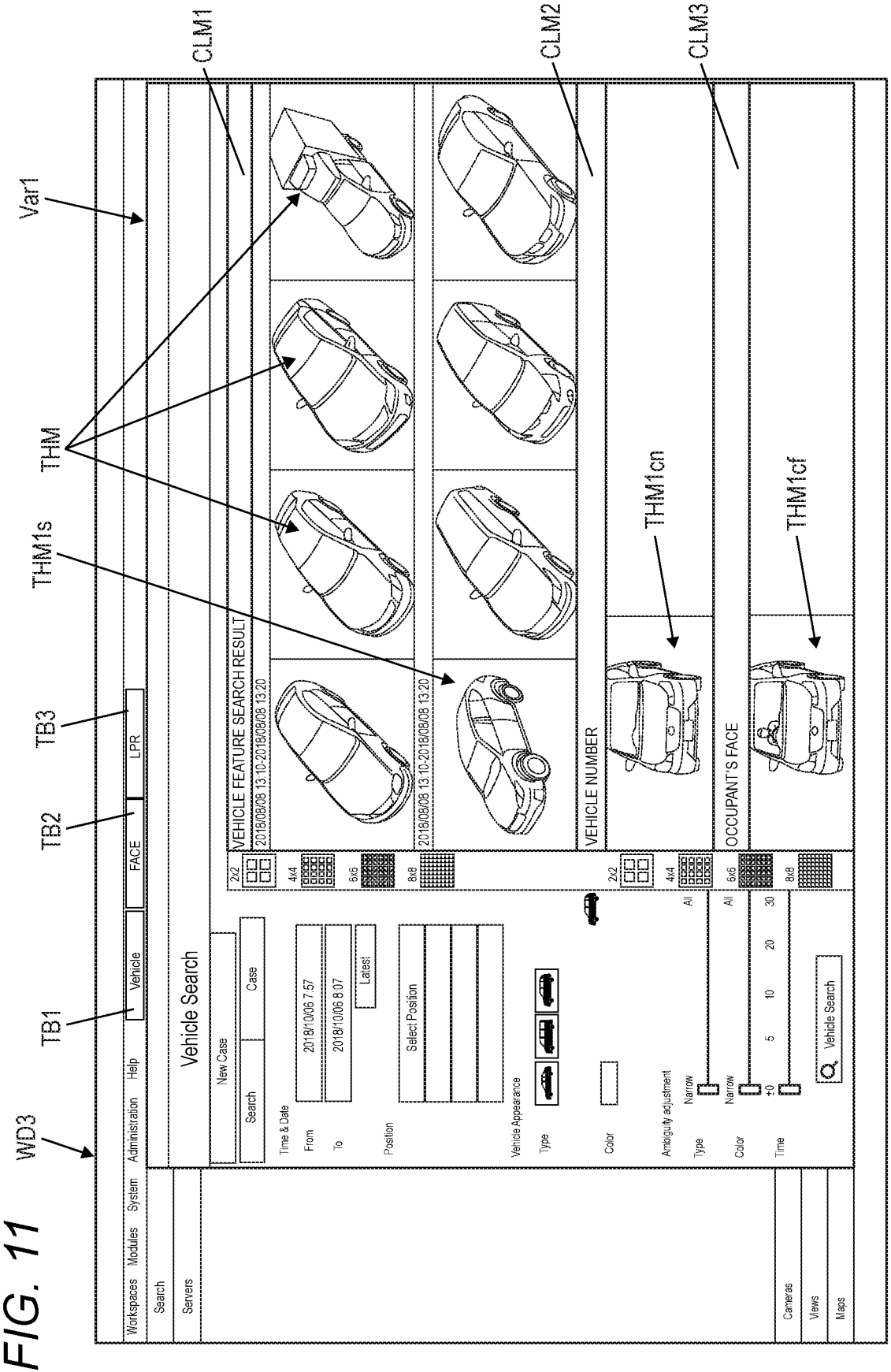
FIG. 11 is a diagram illustrating an example of a vehicle search result screen.

FIG. 8 is a diagram illustrating an example of a vehicle search screen WD2. FIG. 9 is a diagram illustrating an example of the vehicle search screen WD2 on which an input window DTL1 for inputting vehicle feature information is displayed. FIG. 10 is a diagram illustrating an example of a multi-input window DTL2 of feature information on the vehicle and the person. FIG. 11 is a diagram illustrating an example of a vehicle search result screen WD3. The investigation assist app displays the vehicle search screen WD2 illustrated in FIG. 8 on the display unit 93 as operated by the operator.

The vehicle search screen WD2 includes a search condition input field for requesting the vehicle search server 60 to search for a vehicle, and a vehicle search display region Var1 displaying the road map information recorded in the memory 92 and the corresponding road map MP1 side by side. The investigation assist app displays the vehicle search display region Var1 in response to the operation for selecting a vehicle search tab TB1 by the operator.

Icons Pt1, Pt2, Pt3, Pt4, Pt5, Pt6, Pt7, Pt8, Pt9, Pt10 and Pt11 corresponding the intersections, respectively at which a plurality of cameras (in particular, the intersection camera 10 and one or more vehicle capturing cameras 20) are installed, are displayed on the road map MP1 to indicate positions of the corresponding intersections. Accordingly, the operator can visually recognize a location of the intersection at which the plurality of cameras (in particular, the intersection camera 10 and one or more vehicle capturing cameras 20) are installed. The investigation assist app may display the road map MP1 as being appropriately slidable as operated by the operator.

In a case where the vehicle search server 60 searches for the vehicle information, the search target is the videos captured by the plurality of cameras (in particular, the intersection camera 10 and one or more vehicle capturing cameras 20) are installed at the intersection corresponding to the selected icon as operated by the operator.

The search condition input field includes, for example, a "Latest" icon LT1, "From this date" input field FR1, "To (this date)" input field TO1, location area input field PA1, a display activation icon IC1 for a vehicle feature information input window, fuzzy search bars BBR, and a vehicle search icon VSH1.

The "Latest" icon LT1 is an icon for setting the most recent date as a date range to which the searches are restricted. When the operator pushes the icon during the investigation, the investigation assist app sets the latest date (for example, 10 minutes before a time when the icon is pushed) as a search condition (for example, date range).

The "From this date" input field FR1 is filled as operated by the operator, with a specific date after which the vehicle search server 60 searches for a vehicle potentially being the escaping vehicle of the suspect. For example, a date when the incident has occurred or a date slightly before the incident is input to the "From this date" input field FR1. FIGS. 8, 9 and 11 respectively show a case where "2018-08-08 07:57" is input to the "From this date" input field FR1. When a date is input as operated by the operator, the investigation assist app sets the date input to the "From this date" input field FR1 as a search condition (for example, a specific date that the operator would like to search by).

The "To (this date)" input field TO1 is filled as operated by the operator, with a date before which the vehicle search server 60 searches for a vehicle potentially being the escaping vehicle of the suspect. For example, a date until which the operator would like to finish the searches for the escaping vehicle is input to the "To (this date)" input field TO1. FIGS. 8, 9 and 11 respectively show a case where "2018-08-09 08:07" is input to the "To (this date)" input field TO1. When a date is input as operated by the operator, the investigation assist app sets the date input to the "To (this date)" input field TO1 as a search condition (for example, a specific date until which the operator would like to complete the searches).

The location area input field PA1 is filled as operated by the operator, with a specific location area where the vehicle search server 60 searches for a vehicle potentially being the escaping vehicle of the suspect. For example, when one of the icons Pt1 to Pt 11 shown on the road map MP1 is selected as operated by the operator, the investigation assist app sets a name of the intersection corresponding to the selected icon in the location area input field PA1. FIGS. 8 and 9 respectively show a case where, for example, "Intersection ZW1" corresponding to the icon Pt7 is set in the location area input field PA1. Up to four location areas can input to the location area input field PA1 of the investigation assist app. For example, error message may be popped up when accepting more than four areas.

The fuzzy search bars BBR includes a vehicle type fuzzy search bar, a vehicle color fuzzy search bar, and a time fuzzy search bar.

The vehicle type fuzzy search bar is a slider that can adjust a search accuracy for a vehicle type as operated by the operator, from "Narrow" to narrow a search range to "All" to find all vehicle types. In a case where the slider is adjusted to a "Narrow" side, the investigation assist app sets the same type as that entered in a vehicle type input field SY1 as a search condition (for example, vehicle type). Meanwhile, in a case where the slider is adjusted to "All" side, the investigation assist app sets a search condition (for example, vehicle type) which is not limited to the type entered in the vehicle type input field SY1 but includes all vehicle types of options ITM1 (see FIGS. 9 and 10).

The vehicle color fuzzy search bar is a slider that can adjust a search accuracy for a vehicle color as operated by the operator, from "Narrow" to narrow a search range to "Wide" to search a wide range. In a case where the slider is adjusted to a "Narrow" side, the investigation assist app sets the same color as that entered in a vehicle color input field CL1 as a search condition (for example, vehicle color). Meanwhile, in a case where the slider is adjusted to a "Wide" side, the investigation assist app sets a search condition (for example, vehicle color) with a wide range including colors similar to or analogue to the color entered in the vehicle color input field CL.

The time fuzzy search is a slider that can adjust a search accuracy for a time range (since XX:XX until XX:XX), for example, ±30 minutes (that is, −30, −20, −10, −5, 0, +5, +10, +20, and +30), as operated by the operator. In a case where the slider is slid to any position between −30 side and +30 side as operated by the operator for each of the "From this date" input field FR1 and the "To (this date)" input field TO1, the investigation assist app sets a search condition (for example, date) upon adjusting the time entered in each of the "From this date" input field FR1 and the "To (this date)" input field TO1 in response to the position of the slider of the time fuzz search bar.

The vehicle search icon VSH1 is displayed as being pushable by the investigation assist app when all of various search conditions input as operated by the operator are properly entered. When the vehicle search icon VSH1 is pushed as operated by the operator, the investigation assist app detects that the icon is pushed, generates the information acquisition request for a vehicle, including the various input search conditions, and sends the request to the vehicle search server 60 via the communication unit 91. The investigation assist app receives and acquires the vehicle search result sent from the vehicle search server 60 based on the information acquisition request for a vehicle via the communication unit 91.

Further, in a case where it is detected that the display activation icon IC1 for input window is pushed as operated by the operator, the investigation assist app displays the input window DTL1 capable of selecting type and color of the escaping vehicle in detail, which is overlapped on the road map MP1.

The vehicle type input field SY1 is filled, as operated by the operator, with a type of a vehicle potentially being the escaping vehicle of the suspect, selected from the multiple options ITM1, based on which the vehicle search server 60 searches for the escaping vehicle of the suspect. From the vehicle type options ITM1 of the input window DTL1, "Sedan", "Station Wagon (Van)", "SUV (sport utility vehicle)". "Truck", "Bus", or "Pickup truck" (a light-duty truck having an open cargo area behind a cabin where the occupant is seated) can be selected.

A motorcycle (that is, two-wheeled vehicle) may be included as one of the options. At least one option is selected as operated by the operator. In FIGS. 8 and 9, for example, "Sedan", "Station Wagon (Van)" and "SUV" are selected.

The vehicle color input field CL is filled, as operated by the operator, with a color of a vehicle potentially being the escaping vehicle of the suspect, selected from the multiple options ITM2, based on which the vehicle search server 60 searches for the escaping vehicle of the suspect. From the vehicle color options ITM2 of the input window DTL1, "Gray/Silver". "White", "Red", "Black", "Blue", "Green", "Brown", "Yellow", "Purple" or "Pink" can be selected. At least one option is selected as operated by the operator. In FIGS. 8 and 9, for example, "White" is selected.

In the first embodiment, the vehicle capturing camera 20 is also capable of capturing a face image of a person in the vehicle. Therefore, as illustrated in FIG. 10, the investigation assist app may display a multi-input window DTL2 including an input window VDTL for vehicle's appearance features and an input window PDTL for person's appearance features, on the vehicle search screen WD2, such that appearance features of the suspect (person) can also be set as a search condition as well as those of the escaping vehicle. The input window VDTL is the same as the input window DTL1 shown in FIG. 9, thus the description will be omitted.

The multi-input window DTL2 illustrated in FIG. 10 includes a switch SW1 for enabling to designate a search condition in the input window VDTL, a switch SW2 for enabling to designate a search condition in the input window PDTL, the input window VDTL, and the input window PDTL. The investigation assist app switches the input window VDTL between turn-on state and turn-off state by switching the switch SW1 as operated by the operator. Similarly, the investigation assist app switches the input window PDTL between turn-on state and turn-off state by switching the switch SW2 as operated by the operator.

In the input window PDTL, "Features (Characteristics)" and "Clothing (Decoration)" can be set as appearance feature factors of a person. Further, the investigation assist app can add at least one color, selected from a color palette ITM5 as operated by the operator, to a search target person profile IPS1 for the option "Clothing (Decoration)". The investigation assist app displays the search target person profile IPS1 specified by designating "Features (Characteristics)" and "Clothing (Decoration)" as operated by the operator within the input window PDTL. Consequently, the operator can visually confirm the search target person profile IPS1 corresponding to "Features (Characteristics)" and "Clothing (Decoration)" options designated by the operation, and can easily judge whether his/her setting is right or not.

For the option "Features (Characteristics)", options ITM3 relating to some of person's appearance features are displayed as being selectable. The displayed options ITM3 include sex options (in particular, "Male" and "Female"), age options (in particular. "Young (Younger)", "Middle-aged (Middle)" and "Old (Older)"), height options (in particular, "Short (Small)", "Middle (Normal)" and "Tall (Large)") and shape options (in particular, "Thin (Slim)", "Middle (Normal)" and "Fat (Thick)"). Thus, the operator can select the detailed appearance features of the person, such as sex or height.

For the option "Clothing (Decoration)", options ITM4 relating to some of person's appearance features are displayed as being selectable. The displayed options ITM4 include stuff options (in particular, "With Bag" and "No Bag"), accessory options (in particular. "With Hat" or "No Hat"), upper-body options (in particular. "Long-sleeved (Long sleeved)", "Short-sleeved(Short sleeved)" and "Others"), lower-body options (in particular, "Long Pants". "Short Pants", "Skirt" and "Others"), and hairstyle options (in particular, "Long Hair". "Short Hair", "Bald (No Hair)" and "Others"). The colors can also be selected from the color palette ITM5 for clothing, stuffs, and accessories. For example, "Gray", "Black", "White", "Red", "Green". "Blue", "Yellow", "Orange", "Brown", "Purple" and "More Colors (Free)" can be selected. Thus, the operator can select the detailed appearance features relating to the clothing of the suspect (person).

The investigation assist app acquires the vehicle search result sent from the vehicle search server 60 by the operator pushing the vehicle search icon VSH1 in the vehicle search screen WD2, and displays on the display unit 93 the vehicle search result screenWD3 relating to one or more candidate vehicles potentially being the escaping vehicle. The vehicle search result screen WD3 displays a search condition input field to request the vehicle search server 60 to search for a vehicle, and the vehicle search result returned from the vehicle search server 60, which is related to one or more candidate vehicles, in the vehicle search result screen Var1.

The vehicle search result illustrated in FIG. 11 is displayed on the display unit 93, and divided into a display region CLM1 for the vehicle feature search result, a display region CLM2 for the vehicle's license plate and a display region CLM3 for the occupant's face. Thumbnail images THM are displayed on the display region CLM1, which show one or more candidate vehicles potentially being the escaping vehicle based on the analysis result of the video captured by the intersection camera 10.

When a thumbnail image (for example, a thumbnail image THM1s) is selected from the thumbnail images THM as operated by the operator, the investigation assist app displays on the display regions CML2 and CML3 the analysis results based on the videos captured by the vehicle capturing cameras 20 (for example, the analysis results by the vehicle search server 60), corresponding to the vehicle in the selected thumbnail image THM is, respectively, as the candidate vehicle potentially being the escaping vehicle.

Therefore, a thumbnail image THM1cn is displayed on the display region CLM2 illustrated in FIG. 11, which is a thumbnail image of the candidate vehicle (that is, the vehicle of the thumbnail image THM1s) searched by the vehicle search server 60 on the basis of the analysis results based on the videos captured by the vehicle capturing cameras 20 (especially the captured video mainly and clearly showing the license plate). The thumbnail image THM1cn clearly shows the license plate of the vehicle, and thus the operator can easily confirm the license plate. When it is detected that a predetermined operation (for example, right click) by the operator is carried out while the thumbnail image THM1cn is displayed on the display region CLM2, the investigation assist app can read the license plate in the thumbnail image THM1cn and execute a search using the reading result of the license plate.

Further, a thumbnail image THM1cf is displayed on the display region CLM3 illustrate in FIG. 11, which is a thumbnail image of the candidate vehicle (that is, the vehicle of the thumbnail image THM is) searched by the vehicle search server 60 on the basis of the analysis results based on the videos captured by the vehicle capturing cameras 20 (especially the captured video mainly and clearly showing the occupant's face). The thumbnail image THM1cf clearly shows a face of a person in the vehicle (for example, the suspect, or the suspect and his/her companion), and thus the operator can easily confirm the face of the person. When it is detected that a predetermined operation (for example, right click) by the operator is carried out while the thumbnail image THM1cf is displayed on the display region CLM3, the investigation assist app can execute a search using the face image in the thumbnail image THM1cf.

Figure 12:
FIG. 12 is a diagram illustrating an example of a real-time alert screen.

FIG. 12 is a diagram illustrating an example of a real-time alert screen WD4. The real-time alert screen WD4 is displayed on the display unit 93 by the investigation assist app. The real-time alert screen WD4 indicates a history (for example, a history Hst1) of warning notifications in a chronological order, each of which is generated on the basis of detecting that the person registered in the blacklist held by the database 71 of the face search server 70 has passed in front of the cameras (in particular, the intersection camera 10 and one or more vehicle capturing cameras 20). For instance, the processing unit 72 of the face search server 70, receiving the captured videos from those cameras, detects that such a person has passed in front of the cameras. For example, as illustrated in FIG. 12, face images of "Taro ABC" is held in the blacklist of the database 71, with the time stamps when the respective cameras have detected and captured "Taro ABC" passing the front of the cameras in order of "SP301", "SP302", "SP303", "SP304", "SP305" and "SP306". A latest warning notification ALM1 indicates that "Taro ABC" has passed in front of the camera "SP306" at "15:40:33" on "Jan. 30, 2019".

As stated above, in the investigation assist system 100, the client terminal 90 sends to the face search server 70 the suspect's information (personal information) including the face image of the suspect. The face search server 70 registers personal information of the suspect, sent from the client terminal 90, in the database 71, and thus can determine in real time whether or not the suspect has passed in front of the cameras based on the videos captured by the cameras (in particular, the intersection camera 10 and one or more vehicle capturing cameras 20). Further, the face search server 70 returns the determination result to the client terminal 90. The client terminal 90 generates and displays the real-time alert screen WD4 based on the determination result sent from the face search server 70, and thus can accurately confirm the camera in front of which the suspect has passed in real time.

Figure 13:
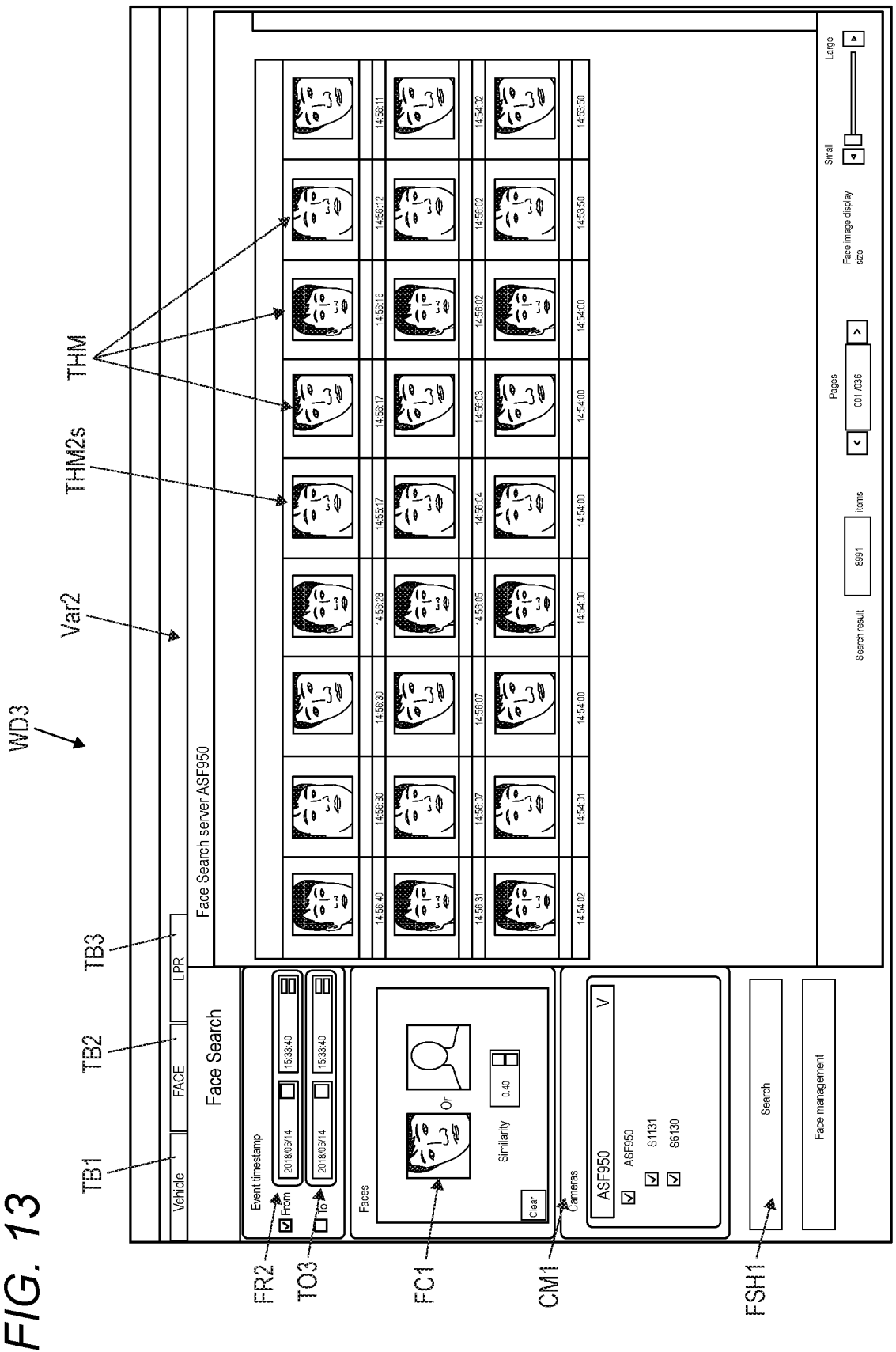
FIG. 13 is a diagram illustrating an example of a face search display region.

FIG. 13 is a diagram illustrating an example of a face search display region Var2. The face search display region Var2 is a display region switched from the vehicle search display region Var1 corresponding to the vehicle search tab TB1, in response to the operation by the operator to select a face search tab TB2 within the vehicle search result screen WD3 displayed on the display unit 93. Further, since the face search tab TB2 is also displayed on the vehicle search screen WD2 (see FIGS. 8 and 9), the face search display region Var2 may be displayed within the vehicle search screen WD2.

The face search display region Var2 includes a face search result display region in which the search condition input field for requesting the face search server 70 to search for a face and the face search result are displayed side by side. As stated above, the investigation assist app displays the face search display region Var2 within the vehicle search result screen WD3 in response to the operation for selecting the vehicle search tab TB2 by the operator. The search condition input field includes, for example, a "From this date" input field FR2, a "To (this date)" input field TO2, a designation field for designating an input face image FC1 used for the face search, a specifying field CM1 for specifying a camera to be subjected to the face search, and a face search icon FSH1.

The "From this date" input field FR2 is filled as operated by the operator, with a specific date after which the face search server 70 searches for the suspect's face corresponding to a search target. When a date is input as operated by the operator, the investigation assist app sets the date input to the "From this date" input field FR2 as a search condition (for example, a specific date that the operator would like to search by).

The "To (this date)" input field TO2 is filled as operated by the operator, with a specific date before which the face search server 70 searches for the suspect's face corresponding to a search target. When a date is input as operated by the operator, the investigation assist app sets the date input to the "To (this date)" input field TO2 as a search condition (for example, a specific date until which the operator would like to complete the searches).

For example, the specified face image of the suspect is set by the investigation assist app as operated by the operator as the input face image FC1. The face image of the suspect is, for example, an image obtained by trimming the face appeared in the thumbnail image THM1cf (see FIG. 11) in the vehicle search display region Var1 within the vehicle search display region WD3, which is searched from the videos captured by the vehicle capturing cameras 20.

The cameras (for example, the intersection camera 10 and one or more vehicle capturing cameras 20) of a place where the suspect is potentially present are selected in the specifying field CM1 for specifying a camera to be subjected to the face search, by the investigation assist app as operated by the operator.

The face search icon FSH1 is displayed as being pushable by the investigation assist app when all of various search conditions input as operated by the operator are properly entered. When the face search icon FSH1 is pushed as operated by the operator, the investigation assist app detects that the icon is pushed, generates the information acquisition request for a face (for example, the suspect's face), including the various input search conditions, and sends the request to the face search server 70 via the communication unit 91. The investigation assist app receives and acquires the face search result sent from the face search server 70 based on the information acquisition request for a face via the communication unit 91.

As illustrated in FIG. 13, the investigation assist app displays a series of face search results (in particular, the thumbnail image THM of the face image and date information on a date when such a face image has been extracted), searched in chronological order, on the face search display region Var2 side by side. For example, a thumbnail image THM2s and a time stamp "14:55:17" are displayed, in which the time stamp is associated with the thumbnail image as date information on a date when the face image appeared in the thumbnail image THM2s has been extracted. Consequently, when the suspect's face is specified in detail, the operator can specify when and where the suspect has appeared at a location that the cameras are installed by means of the face search executed by the face search server 70, thereby improving efficiency of the investigation.

FIG. 14 is a diagram illustrating an example of an LPR search display region Var3. The LPR search display region Var3 is a display region switched from the vehicle search display region Var1 corresponding to the vehicle search tab TB1, in response to the operation by the operator to select an LPR search tab TB3 within the vehicle search result screen WD3 displayed on the display unit 93. Further, since the LPR search tab TB3 is also displayed on the vehicle search screen WD2 (see FIGS. 8 and 9), the LPR search display region Var3 may be displayed within the vehicle search screen WD2.

The LPR search display region Var3 includes an LPR search result display region in which the search condition input field for requesting the LPR search server 80 to search for a license plate (LPR search) and the license plate search result are displayed side by side. As stated above, the investigation assist app displays the LPR search display region Var3 within the vehicle search result screen WD3 in response to the operation for selecting the LPR search tab TB3 by the operator.

The search condition input field includes, for example, a "From this date" input field FR3, a "To (this date)" input field TO3, a specifying field CM2 for specifying a camera to be subjected to the LPR search, a designation field LP1 for designating a type of the license plate to be subjected to the LPR search, and an LPR search icon LSH1.

The "From this date" input field FR3 is filled as operated by the operator, with a specific date after which the LPR search server 80 searches for the license plate of the escaping vehicle corresponding to a search target. When a date is input as operated by the operator, the investigation assist app sets the date input to the "From this date" input field FR3 as a search condition (for example, a specific date that the operator would like to search by).

The "To (this date)" input field TO3 is filled as operated by the operator, with a specific date before which the LPR search server 80 searches for the license plate of the escaping vehicle corresponding to a search target. When a date is input as operated by the operator, the investigation assist app sets the date input to the "To (this date)" input field TO3 as a search condition (for example, a specific date until which the operator would like to complete the searches).

The cameras (for example, the intersection camera 10 and one or more vehicle capturing cameras 20) of a place where the escaping vehicle of the suspect is potentially present are selected in the specifying field CM2 for specifying a camera to be subjected to the LPR search, by the investigation assist app as operated by the operator.

A type of the license plate to be subjected to the LPR search is selected in the designation field LP1 for designating a type of the license plate, by the investigation assist app as operated by the operator.

The LPR search icon LSH1 is displayed as being pushable by the investigation assist app when all of various search conditions input as operated by the operator are properly entered. When the LPR search icon LSH1 is pushed as operated by the operator, the investigation assist app detects that the icon is pushed, generates the information acquisition request for a license plate (for example, the license plate of the escaping vehicle used by the suspect), including the various input search conditions, and sends the request to the LPR search server 80 via the communication unit 91. The investigation assist app receives and acquires the LPR search result sent from the LPR search server 80 based on the information acquisition request for a license plate via the communication unit 91.

As illustrated in FIG. 14, the investigation assist app displays the LPR search result in the LPR search display region Var3, in which a license plate search result list LST1 including license plates of various vehicles chronologically searched and detailed information on one license plate selected by a cursor CSR1 from the list LST1 are arranged side by side. The license plate search result list LST1 lines up a plurality of the search results, each of which includes at least a date when the license plate has been extracted by the video analysis of the LPR search server 80, a name of a camera used for the video analysis, and the reading result of the license plate (number plate).

When one of the search results is selected from the list LST1 as operated by the operator, the investigation assist app displays the detailed information (including images) on a vehicle having the license plate in the selected search result. In particular, the investigation assist app displays a date when the license plate selected by the cursor CSR1 has been extracted by the video analysis of the LPR search server 80, a name of a camera used for the video analysis, license plate attribute information PL1 (including a vehicle captured image LPcap1 of a vehicle having such a license plate and a license plate image LPcap2), vehicle attribute information VCL1, and vehicle owner's personal information OWN1 including his/her face image PHT1, which are associated with each other. In FIG. 14, the captured image LPcap1 is a captured image when the target vehicle is viewed from a rear side. As stated above, the vehicle capturing camera 20 is capable of simultaneously capturing the occupant's face and the license plate, and thus the captured image may be a captured image when the target vehicle is viewed from a front side from which the occupant's face is visible instead of the captured image when the target vehicle is viewed from the rear side. Alternatively, two captured images as viewed from the rear side and the front side may be arranged in contrast.

The license plate attribute information PL1 includes the reading result of the license plate, a name of country, state or prefecture, and a color of the license plate. The vehicle attribute information VCL1 includes a manufacture date, a maker's name, a color and a model of the vehicle. The personal information OWN1 includes a name of the vehicle's owner and the face image PHT1 of the owner. Consequently, when the license plate of the escaping vehicle used by the suspect is specified in detail, the operator can specify when and where the license plate of the escaping vehicle used by the suspect has appeared at a location that the cameras are installed, and further the personal information of the vehicle's owner, including a face image, by means of the LPR search executed by the LPR search server 80, thereby improving efficiency of the investigation.

The client terminal 90 may display only the list LST1 as the search result by the LPR search server 80. In other words, the LPR search server 80 may return to the client terminal 90 the LPR search result, which includes a date when the license plate has been extracted by the video analysis of the LPR search server 80, a name of a camera used for the video analysis, and the reading result of the license plate (number plate). In this case, the client terminal 90 accesses the external database D10 to acquire the detailed information on the license plate selected by the cursor CSR as operated by the operator, for example, license plate attribute information PL1 (including the vehicle captured image LPcap1 of the vehicle having such a license plate, and the license plate image LPcap2), vehicle attribute information VCL1, and vehicle owner's personal information OWN1 including his/her face image PHT1.

Figure 15:
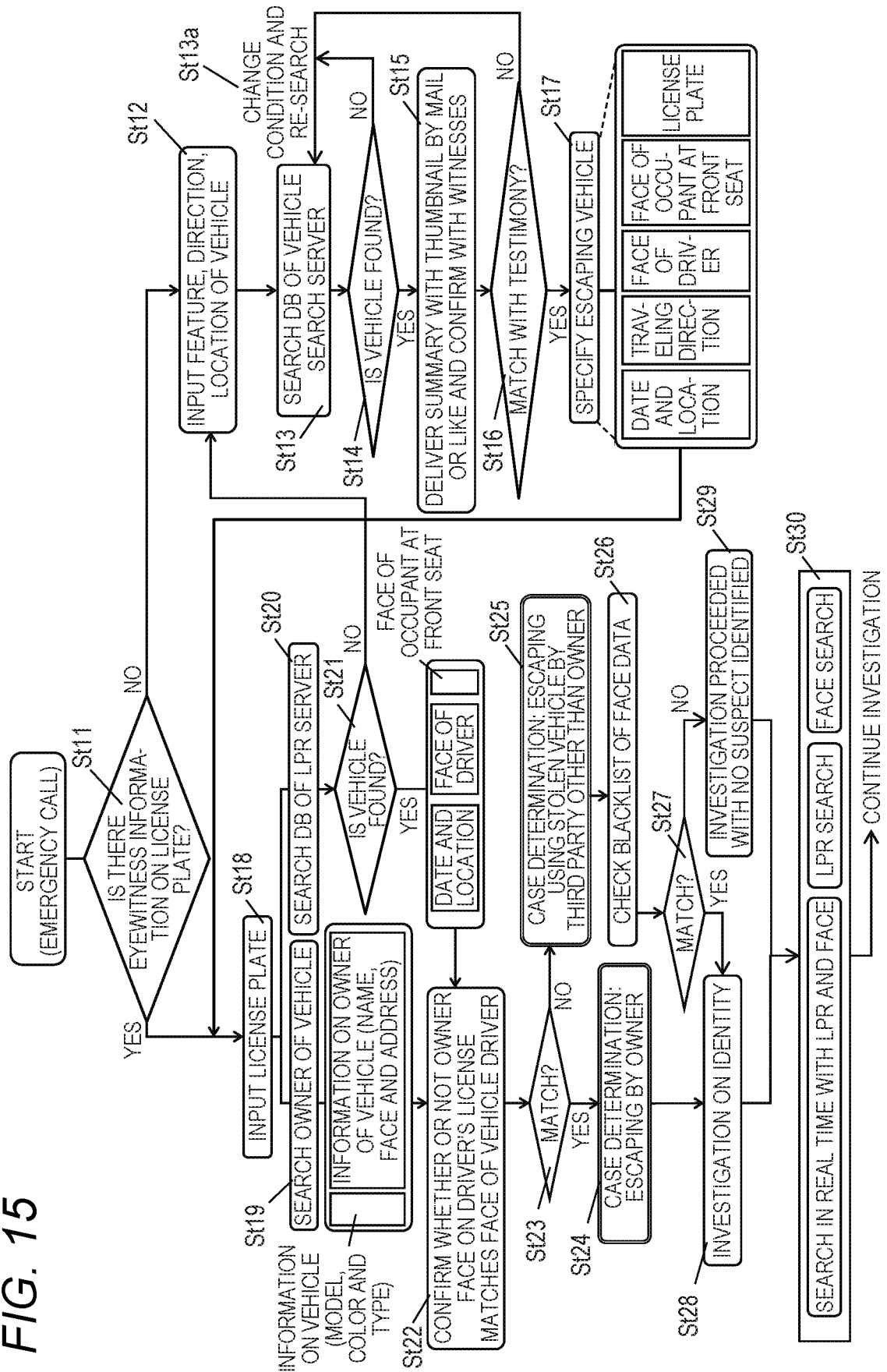
FIG. 15 is a flowchart illustrating an operation procedure of the investigation assist system according to the first embodiment.

An operation procedure of the investigation assist system 100 according to the first embodiment will be described with reference to FIG. 15. FIG. 15 is a flowchart illustrating the operation procedure of the investigation assist system 100 according to the first embodiment. For illustrating FIG. 15, it is assumed that the incident (for example, hit-and-run) has occurred at an intersection so as to comply with FIG. 1.

In FIG. 15, when the witness of the incident calls (reports) to the police station in an emergency, the police operator gathers details of the incident from the witness. At this time, the investigation assist app is activated in the client terminal 90. First, in a case where there is no eyewitness information on the license plate of the escaping vehicle used by the suspect (NO is St11), the investigation assist app accepts input of various information gathered from the witness (for example, appearance features and an escaping direction of the escaping vehicle used by the suspect of the incident, and a date and a location on and at which the incident has occurred) as operated by the operator (St12).

The investigation assist app generates the information acquisition request for the escaping vehicle, including some or all of the information input in step St12 as the search conditions, and sends the request to the vehicle search server 60. The vehicle search server 60 searches for a vehicle satisfying the search conditions included in the information acquisition request based on the analysis results of the cameras (in particular, some or all of the intersection cameras 10, and some or all of the one or more vehicle capturing cameras 20), held in the database 61, in accordance with the information acquisition request for the escaping vehicle sent from the investigation assist app (that is, the client terminal 90) (St13). The vehicle search server 60 sends the vehicle search result in step St13 to the client terminal 90. Additionally, the investigation assist app can register up to 20 cameras (the intersection camera 10 and the vehicle capturing cameras 20) at each of maximally four locations. The captured videos of the registered cameras will be used in analysis processing of the server cluster SV.

In a case where it is determined there is a vehicle satisfying the search conditions in the vehicle search result sent from the vehicle search server 60 (YES in St14), the investigation assist app (that is, the client terminal 90) displays the vehicle search result including thumbnail images of one or more candidate vehicles potentially being the escaping vehicle in the vehicle search result screen WD3. Further, the investigation assist app generates a candidate report (see FIG. 1) including the vehicle search result stated above and sends the report to the police terminal T10 held by the officer on duty at the scene of the incident via the network NW2 (St15). The officer on duty at the scene of the incident requests the witness to visually confirm the candidate report sent and displayed on the police terminal T10 (St15). In a case where there is no candidate vehicle matching the witness's testimony (NO in St16), or in a case where it is determined that there is no vehicle satisfying the search conditions in the vehicle search result sent from the vehicle search server 60 (NO in St14), information indicating that there is no candidate is sent to the client terminal 90 by the officer on duty or the operator. The client terminal 90 updates the search conditions as operated by the operator, generates the information acquisition request for the escaping vehicle including the updated search conditions, and sends the request to the vehicle search server 60 (St13a).

Meanwhile, in a case where there is a candidate vehicle matching the witness's testimony (YES in St16), the police terminal T10 sends to the client terminal 90 a thumbnail image of the escaping vehicle matching the witness's testimony as operated by the officer on duty. The client terminal 90 can specify the escaping vehicle in detail based on the thumbnail image sent from the police terminal T10, thereby acquiring various information on the escaping vehicle (St17). In particular, the client terminal 90 can acquire a date and a location (location of the intersection) at which the escaping vehicle has been captured by the cameras, a traveling direction when the escaping vehicle has passed through the intersection, a face image of the driver (that is, suspect), a face image of the occupant at a front seat (that is, his/her companion), and a license plate image of the escaping vehicle (see FIG. 11). Thereafter, processing of the investigation assist system 100 proceeds to step St18. Further, the client terminal 90 may employ the following approach instead of receiving and acquiring the thumbnail image of the escaping vehicle from the police terminal T10 as operated by the officer on duty. For example, the officer on duty listens oral statement about the candidate report visually confirmed by the witness and delivers the result (for example, identification information, e.g. a thumbnail number, for the thumbnail image of the escaping vehicle selected by the witness) to the operator via a telephone or email.

In a case where there is the eyewitness information on the license plate of the escaping vehicle used by the suspect (YES in St11), or after step St17, the investigation assist app (that is, the client terminal 90) accepts the input of a license plate image or license plate text information of the escaping vehicle (St18) as operated by the operator. Thereafter, the client terminal 90 executes processing of step St19 and processing of step St20 in parallel.

In particular, the investigation assist app (that is, the client terminal 90) accesses each of the stolen vehicle database D12 and the vehicle license database D13 to search for an owner of the escaping vehicle based on the license plate image or the license plate text information of the escaping vehicle (St19). Consequently, the investigation assist app can acquire owner information on the owner of the escaping vehicle (for example, name, face image and address of the owner, whether or not vehicle theft has been reported, vehicle investigation information of the escaping vehicle) and vehicle information on the escaping vehicle (for example, model, color and type of the escaping vehicle).

Further, the investigation assist app (that is, the client terminal 90) generates an information acquisition request for a license plate of the escaping vehicle with the date acquired in step St17 and information on the cameras at the intersection corresponding to the location acquired in step St17, as the search conditions. The investigation assist app sends the information acquisition request to the LPR search server 80.

The LPR search server 80 searches for a license plate satisfying the search conditions included in the information acquisition request based on the analysis results of the cameras (in particular, the intersection camera 10, and one or more vehicle capturing cameras 20), held in the database 81, in accordance with the information acquisition request for a license plate sent from the investigation assist app (that is, the client terminal 90) (St20). The LPR search server 80 sends the license plate search result in step St20 to the client terminal 90.

In a case where it is determined that there is no license plate satisfying the search conditions in the license plate search result sent from the LPR search server 80 (NO in St21), processing of the investigation assist system 100 returns to step St12. For example, in a case where it is determined that there is no license plate satisfying the search conditions in the license plate search result, the LPR search server 80 notifies the client terminal 90 of an instruction to input the search conditions of the escaping vehicle again. That is, since the license plate of the escaping vehicle is not correct, processing for specifying the escape vehicle (steps St12 to St17) is repeated until the correct license plate of the escape vehicle is specified.

Meanwhile, in a case where it is determined that there is a license plate satisfying the search conditions in the license plate search result sent from the LPR search server 80 (YES in St21), the investigation assist app (that is, the client terminal 90) acquires a date and a location on and at which a vehicle (escaping vehicle) having the same license plate has been captured by the vehicle capturing camera 20, a face image of the driver (that is, suspect) captured by the vehicle capturing camera 20, and a face image of the occupant at a front seat (that is, his/her companion) captured by the vehicle capturing camera 20 as the license plate search result (see FIG. 14).

The investigation assist app (that is, the client terminal 90) checks whether or not the face image (for example, a face image on the driver's license) of the owner of the escaping vehicle acquired in step St19 matches the face image of the occupant (for example, driver) in the escaping vehicle acquired in step St21 (St22).

In a case where it is determined that the face image of the owner of the escaping vehicle matches the face image of the occupant (for example, driver) in the escaping vehicle (YES in St23), the investigation assist app defines the incident as a case where the owner of the escaping vehicle has fled from the scene (St24).

Meanwhile, in a case where it is determined that the face image of the owner of the escaping vehicle does not match the face image of the occupant (for example, driver) in the escaping vehicle (NO in St23), the investigation assist app defines the incident as a case where a third party other than the owner of the escaping vehicle has fled from the scene (St 25).

Subsequently, the investigation assist app generates an information acquisition request for a face image with the face image of the occupant (for example, driver) in the escaping vehicle acquired in step St21, as the search conditions for the blacklist check, and sends the request to the face search server 70. The face search server 70 searches for a face image satisfying the search conditions included in the information acquisition request based on the analysis results of the cameras (in particular, the intersection camera 10, and one or more vehicle capturing cameras 20), held in the database 71, in accordance with the information acquisition request for a face image sent from the investigation assist app (that is, the client terminal 90) (St26, blacklist check).

The face search server 70 sends the face image search result in step St26 to the client terminal 90.

In a case where it is determined that there is a face image satisfying the search conditions in the face image search result sent from the face search server 70 (YES in St27), the investigation assist app (that is, the client terminal 90) can acquire personal information related to a person in such a face image from the blacklisted face database D11. Consequently, the investigation assist app determines that the suspect can be identified in the investigation, and displays the determination result on the display unit 93 (St28).

Meanwhile, in a case where it is determined that there is no face image satisfying the search conditions in the face image search result sent from the face search server 70 (NO in St27), the investigation assist app (that is, the client terminal 90) cannot acquire personal information related to a person in such a face image from the blacklisted face database D11. Consequently, the investigation assist app determines that the investigation should proceed with no suspect identified, and displays the determination result on the display unit 93 (St29).

After step St28 or step St29, the investigation assist app (that is, the client terminal 90) and the LPR search server 80 continue searches for tracking the license plate of the escaping vehicle used by the suspect, and the investigation assist app (that is, the client terminal 90) and the face search server 70 continue searches for tracking the face image of the suspect (St30).

As stated above, the investigation assist system 100 according to the first embodiment include servers (for example, the record server 50, the vehicle search server 60, the face search server 70, and the LPR search server 80) communicably connected to a plurality of cameras (for example, the intersection camera 10 and one or more vehicle capturing cameras 20), and the client terminal 90 communicably connected to the servers. The plurality of cameras are arranged at each intersection as a group of the intersection camera 10 for capturing a wide range of an intersection, and one or more vehicle capturing cameras 20 for capturing a license plate and an occupant's face of a vehicle entering the intersection. The client terminal 90 sends to the server (for example, the vehicle search server 60), in response to input of search conditions including a date and a location on and at which an incident has occurred, and appearance feature of an escaping vehicle with which a suspect of the incident has fled, an information acquisition request for the escaping vehicle satisfying the search conditions. The server (for example, the vehicle search server 60) searches for vehicles using videos captured by each of the intersection camera 10 and the vehicle capturing cameras 20 corresponding to an intersection at the location on the date, included in the search conditions, to specify a captured image, a license plate and an occupant's face of the escaping vehicle, based on the information acquisition request, thereby holding the specified result as investigation information of the suspect.

Consequently, the investigation assist system 100 is capable of effectively and easily assisting to specify the suspect and the escaping vehicle used by the suspect, for example, in a case where the incident has occurred at or in vicinity of an intersection where lots of people and vehicles come and go, using combined analysis results of the video captured by the plurality of the cameras (for example, the intersection camera 10 and one or more vehicle capturing cameras 20) having different functions, installed at every intersection. For example, even in a case where the license plate of the escaping vehicle used by the suspect of the incident is unrecognizable, the investigation assist system 100 easily narrows down the candidate vehicles potentially being the escaping vehicle based on the appearance feature of the vehicle (for example, color, type and direction in which the suspect has fled), and can track the escaping vehicle with the occupant's face and the license plate as clues, acquired from the videos captured by the vehicle capturing cameras 20, each of which is capable of simultaneously capturing the occupant's face and the license plate. Even in a case where the suspect has fled on foot abandoning the escaping vehicle, the investigation assist system 100 can track the suspect using the face image of the suspect as a clue. Moreover, even in a case where the driver has been replaced with the occupant at the front seat after the incident, the investigation assist system 100 can track the suspect using the license plate of the escaping vehicle as a clue. Therefore, the operator can check a possibility that the suspect gets off the escaping vehicle. Further, even in a case where the suspect has fled into an area without the vehicle capturing cameras 20, the investigation assist system 100 can track the suspect based on the appearance features of the escaping vehicle. Therefore, according to the investigation assist system 100, the convenience of the police investigation can be appropriately improved.

Further, the server (for example, the vehicle search server 60) sends the investigation information on the suspect (for example, the captured image and the specifying results of the license plate and the occupant's face, of the escaping vehicle) to the client terminal 90. The client terminal 90 displays the investigation information of the suspect on the display unit 93. Consequently, the police operator can quickly and visually confirm the investigation information on the suspect of the incident.

The client terminal 90 sends the information acquisition request to the server (for example, vehicle search server 60) in a case where the license plate of the escaping vehicle is not included in the search conditions. Consequently, even in a case where the witness of the incident does not recall the license plate of the escaping vehicle, the investigation assist system 100 can narrow down the candidate vehicles potentially being the escaping vehicle with high accuracy by the vehicle search using the analysis results of the video captured by the intersection camera 10 and the vehicle capturing cameras 20, on the basis of bibliographic information including appearance features of the escaping vehicle, and a date and a location on and at which the incident has occurred, which are highly likely to be aware by the witness.

The client terminal 90 is also capable of accessing the vehicle license database D13 for recording owner information on the vehicle's owner including his/her face image, and searches for the owner information of the escaping vehicle using the vehicle license database D13, based on the license plate of the escaping vehicle included in the investigation information of the suspect. Further, the client terminal 90 sends to the server (for example, the LPR search server 80) an information acquisition request for a vehicle having the license plate of the escaping vehicle based on the license plate of the escaping vehicle included in the investigation information of the suspect. Consequently, the investigation assist system 100 can specify the owner information of the escaping vehicle with the license plate of the escaping vehicle as a clue and easily track the whereabouts of the escaping vehicle, thereby improving efficiency of the investigation.

The client terminal 90 matches a face image of the owner of the escaping vehicle included in the owner information of the escaping vehicle to a face image of the occupant included in the search result of the vehicle having the license plate of the escaping vehicle, which is based on the information acquisition request for a vehicle. Consequently, the investigation assist system 100 can easily determine whether the owner of the escaping vehicle is the same as the suspect of the incident, based on whether or not the face image of the owner of the escaping vehicle matches the face image of the occupant in the vehicle having the license plate, thereby efficiently assisting to quickly specify the suspect.

Additionally, the server (for example, the LPR search server 80) holds in the database 81 a blacklist in which personal information including a face image of a person who is an ex-convict is registered. In a case where it is determined that the face image of the owner of the escaping vehicle included in the owner information of the escaping vehicle does not match the face image of the occupant included in the search result of the vehicle having the license plate of the escaping vehicle, the server (for example, the LPR search server 80) searches for a person who matches the face image of the occupant using the blacklist. Consequently, in a case where the face image of the occupant in the vehicle having the license plate of the escaping vehicle matches a person registered in the blacklist, the investigation assist system 100 can easily and quickly specify the personal information of the suspect.

The server (for example, the LPR search server 80) sends to the client terminal 90 an instruction to input the search conditions again in a case where the obtained search result is that there is no vehicle having the license plate of the escaping vehicle. Consequently, the investigation assist system 100 can repeatedly specify the escaping vehicle until the correct license plate of the escaping vehicle is specified.

The server (for example, the vehicle search server 60) sends to the client terminal 90 multiple groups of extraction results, each of which is a candidate set of the captured image, the license plate and the occupant's face of the escaping vehicle and is obtained from the search for vehicles. The client terminal 90 sends to the server (for example, the vehicle search server 60) a set of extraction results selected from the multiple groups of extraction results. The server (for example, the vehicle search server 60) specifies such a set of extraction results as the captured image, the license plate and the occupant's face of the escaping vehicle. Consequently, in a case where multiple groups of extraction results are acquired as the candidate vehicles potentially being the escaping vehicle, the investigation assist system 100 can rapidly specify a set of extraction results selected as operated by the operator who is familiar with the witness's testimony as the investigation information of the suspect, thereby smoothly tracking the suspect.

The client terminal 90 is communicably connected to the police terminal T10 held by the police officer who is present at the location where the incident has occurred. The client terminal 90 sends to the police terminal T10 the multiple groups of the extraction results as a candidate report, receives from the police terminal T10 such a set of extraction result selected by operation on the police terminal T10 from the witness of the incident, who is with the police officer, and sends to the server (for example, the vehicle search server 60) such a set of the extraction result received from the police terminal T10. Consequently, the investigation assist system 100 can rapidly specify the most reliable extraction results selected by the operation of the witness who actually saw the escaping vehicle as the investigation information of the suspect, thereby smoothly tracking the suspect.

Although various embodiments have been described above with reference to the drawings, the present disclosure is not limited to those embodiments. It will be apparent that those skilled in the art may conceive of various modifications, alterations, replacements, additions, deletions and equivalents within the scope of the claims. It is naturally understood that the scope of the present disclosure encompasses those modifications. Moreover, those skilled in the art may combine each component in various embodiment stated above without departing the gist of the invention.

In the first embodiment stated above, it is exemplified that the detection target in the captured videos of the intersection camera 10 and the vehicle capturing cameras 20 is a vehicle: however, the detection target is not limited to a vehicle but may be other objects (for example, mobile object such as a vehicle). The other objects may be, for example, a flying object such as a drone operated by a person such as the suspect who has occurred the incident.

The present disclosure is useful to provide an investigation assist system and an investigation assist method, each of which efficiently assists, in a case where the incident has occurred, to specify the suspect or the escaping vehicle used by the suspect, thereby improving convenience of the police investigation.

The present application is based upon Japanese Patent Application (Patent Application No. 2019-031980) filed on Feb. 25, 2019, the contents of which are incorporated herein by reference.

What is claimed is:

1. An investigation assist system comprising:
   a server communicably connected to a first camera and one or more second cameras; and
   a client terminal communicably connected to the server,
   wherein the first camera captures a wide range of an intersection and the one or more second cameras capture a license plate and a face of a person in a vehicle entering the intersection, and the first camera and the one or more second cameras are arranged at each intersection,
   the client terminal receives input of search conditions including a date and a location on and at which an incident has occurred and appearance feature of an escaping vehicle in which a suspect of the incident rides, and sends an information acquisition request for the escaping vehicle satisfying the search conditions to the server,
   the server receives the information acquisition request, searches for vehicles based on videos captured by the first camera and the one or more second cameras corresponding to an intersection at the location on the date included in the search conditions of the received information acquisition request, specifies a captured image of the escaping vehicle, a license plate of the escaping vehicle and a face of a person in the escaping vehicle, and stores a specified result as investigation information of the suspect.

2. The investigation assist system according to claim 1, wherein
   the server sends the investigation information of the suspect to the client terminal, and
   the client terminal displays the investigation information of the suspect on a display device.

3. The investigation assist system according to claim 1, wherein the client terminal sends the information acquisition request to the server in a case where the license plate of the escaping vehicle is not included in the search conditions.

4. The investigation assist system according to claim 1, wherein
the client terminal is capable of accessing an owner database for recording owner information including a face image of a vehicle's owner, and
the client terminal searches for owner information of the escaping vehicle using the owner database, based on the license plate of the escaping vehicle included in the investigation information of the suspect, and sends an information acquisition request for a vehicle having the license plate of the escaping vehicle to the server.

5. The investigation assist system according to claim 4, wherein
the client terminal compares a face image of the owner of the escaping vehicle included in the owner information of the escaping vehicle with a face image of the person included in search result of the vehicle having the license plate of the escaping vehicle, which is based on the information acquisition request for a vehicle.

6. The investigation assist system according to claim 5, wherein
the server stores a blacklist for recording personal information of an ex-convict including a face image, and
in a case where it is determined that the face image of the owner of the escaping vehicle included in the owner information of the escaping vehicle does not match the face image of the person included in the search result of the vehicle having the license plate of the escaping vehicle, the server searches for a person who matches the face image of the person based on the blacklist.

7. The investigation assist system according to claim 4, wherein
the server sends an instruction to input the search conditions again in a case where the obtained search result is that there is no vehicle having the license plate of the escaping vehicle to the client terminal.

8. The investigation assist system according to claim 1, wherein
the server sends a plurality of extraction results, each of which is a candidate set of the captured image, the license plate and the face of the person in the escaping vehicle, obtained from the search for vehicles to the client terminal,
the client terminal sends a set of extraction results selected from the plurality of extraction results to the server, and
the server specifies the set of extraction results as the captured image, the license plate and the face of the person in the escaping vehicle.

9. The investigation assist system according to claim 8, wherein
the client terminal is communicably connected to a police terminal held by a police officer who is present at the location where the incident has occurred, and
the client terminal sends to the police terminal the multiple groups of the extraction results as a candidate report, receives from the police terminal a set of extraction result selected by operation on the police terminal from a witness of the incident, who is with the police officer, and sends to the server the set of the extraction result received from the police terminal.

10. An investigation assist method implemented by a server communicably connected to a first camera and one or more second cameras and a client terminal communicably connected to the server,
wherein the first camera captures a wide range of an intersection, and the one or more second cameras capture a license plate and a face of a person in a vehicle entering the intersection, and the first camera and the one or more second cameras are arranged at each intersection,
the method comprising:
receiving, by the client terminal, input of search conditions including a date and a location on and at which an incident has occurred and appearance feature of an escaping vehicle in which a suspect of the incident rides,
sending, by the client terminal, an information acquisition request for the escaping vehicle satisfying the search conditions to the server,
receiving, by the server, the information acquisition request,
searching, by the server, for vehicles based on videos captured by the first camera and the one or more second cameras corresponding to an intersection at the location on the date included in the search conditions of the received information acquisition request,
specifying, by the server, a captured image of the escaping vehicle, a license plate of the escaping vehicle and a face of the person in the escaping vehicle, and
storing, by the server, a specified result as investigation information of the suspect.

* * * * *